United States Patent
Hannon

(10) Patent No.: US 6,694,271 B1
(45) Date of Patent: Feb. 17, 2004

(54) INTEGRATED CIRCUIT BREAKER PROTECTION SOFTWARE

(75) Inventor: Tracy L. Hannon, Melbourne Beach, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 171 days.

(21) Appl. No.: 09/985,959

(22) Filed: Oct. 29, 2001

(51) Int. Cl.$^7$ .............................................. G01R 31/28
(52) U.S. Cl. ......................................... 702/58; 700/22
(58) Field of Search .............................. 702/58, 35, 36, 702/38, 59, 64, 65, 188, 189, 182, 183, 184, 185; 324/76.11, 126; 700/9, 21, 22

(56) References Cited

U.S. PATENT DOCUMENTS

| | | | |
|---|---|---|---|
| 3,970,898 A | | 7/1976 | Baumann et al. |
| 4,038,497 A | | 7/1977 | Collins et al. |
| 4,600,962 A | * | 7/1986 | Bliehall ........................ 361/77 |
| 4,677,282 A | * | 6/1987 | Walsh ......................... 219/508 |
| 4,837,519 A | * | 6/1989 | Lopetrone et al. ........... 324/529 |
| 5,341,268 A | | 8/1994 | Ishiguro et al. |
| 5,608,646 A | * | 3/1997 | Pomatto ....................... 700/286 |
| 5,760,492 A | | 6/1998 | Kanoi et al. |
| 5,930,492 A | | 7/1999 | Lynch |
| 6,018,449 A | | 1/2000 | Nelson et al. |
| 6,236,949 B1 | * | 5/2001 | Hart ............................. 702/64 |

\* cited by examiner

Primary Examiner—Marc S. Hoff
Assistant Examiner—Edward Raymond
(74) Attorney, Agent, or Firm—Howard Kaiser

(57) ABSTRACT

Each circuit breaker in an electrical distribution system is paired with an electronic device which includes a computer processor and an electrical sensor. The processor of each device receives sensory current signals from the sensor contained in the same device, converts the signals from analog to digital data, and processes this digital data into information indicative of the direction of current in the vicinity of the circuit breaker with which the device is paired. The devices are networked (e.g., via Ethernet) so that each device's processor receives the current direction information which is produced by every other device, and processes the entirety of the current direction information which is both locally and remotely produced, thereby identifying the suspected fault in the system and deciding whether to send an activation signal to the circuit breaker with which the device is paired in order to isolate the fault.

16 Claims, 6 Drawing Sheets

INTEGRATED CIRCUIT BREAKER PROTECTION SOFTWARE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to distribution systems (such as electrical power distribution systems), more particularly to methods and apparatuses for identifying or isolating faults (such as electrical faults) pertaining to such systems.

Electrical power distribution systems, such as found in the electrical utility industry and aboard U.S. Naval ships, are subject to developing faults (e.g., failures and defects). The isolation and identification of massive electrical faults serves to minimize the adverse consequences thereof, both electrically and environmentally. For instance, electrical faults can result in burning electrical components which tend to release noxious fumes. Also, electrical faults can create large disturbances in generator fuel efficiencies, leading to incomplete combustion and the concomitant release of hydrocarbons and carbon monoxide into the atmosphere; such happenstance would be especially dire in a shipboard or similarly self-contained environment.

In military contexts, it may be desirable to quickly identify and isolate electrical faults due to combat-induced damage, thus allowing for prolonged operation of combat and other critical shipboard electrical systems. Further, the loss of critical electrical systems may translate to a loss of mission capability of a Navy ship; indeed, the cost of mission failure is potentially incalculable. In civilian contexts, it may be desirable to ensure the continuity of power to vital public facilities and interests such as hospitals, police stations and utilities, especially under exigent circumstances such as when an electrical power system is confronted with natural or other disasters.

Notable is the electrical fault protection technology previously implemented aboard U.S. Naval ships. In the past, the U.S. Navy developed an autonomous coordination logic and incorporated this logic in the "Multi-Function Monitor I" ("MFM I"). This coordination logic was necessary to allow selective coordination among the main distribution circuit breakers in the "AC Zonal Electric Distribution System" ("AC ZEDS"), regardless of plant configuration.

The MFM I unit is an autonomous device that imports line-to-line voltages and line currents, calculates fault current levels and directions, and sends a shunt trip signal to an adjacent circuit breaker if overcurrent thresholds are exceeded for a given time delay. Two time delays are incorporated in the MFM I logic, viz., one for reverse over-currents and another for forward over-currents. Since the shunt trip logic of the MFM I is autonomous, the shunt trip time delays are set to allow selective coordination among other distribution circuit breakers such as the 1600-frame AQB-type switchboard circuit breakers. Selective coordination must also be achieved in a variety of plant configurations, including split plant, single ring and double ring configurations. Consequently, the shunt trip time delays are set at 95 ms for reverse over-currents and 400 ms for forward over-currents. Additionally, the ACB-type breakers may take as long as 55 ms to open once shunt tripped, extending total shunt trip times to 150 ms and 455 ms. Several combinations of shunt trips may be necessary for the isolation of a bus-tie fault, and total fault isolation times vary from 175 ms to over 650 ms.

While the MFM I logic provides selective coordination among the AC ZEDS ACB circuit breakers, the fault isolation times required for autonomous selective coordination are too great for certain purposes; in particular, these fault isolation times are not conducive to maintaining critical combat equipment on-line, thereby allowing fight-through during combat casualty situations.

SUMMARY OF THE INVENTION

In view of the foregoing, it is an object of the present invention to enable expeditious identification and isolation of electrical failures in electrical power distribution systems.

It is a further object of the present invention to enable same so as to maintain the operational condition of such systems, especially when such systems are essential or critical in nature.

It is another object of the present invention to provide method, apparatus, computer, computer memory and computer program product for effecting the foregoing and other objects of the present invention.

Typical apparatus embodiments of the present invention are intended for use in association with an electrical distribution system having a plurality of circuit breakers. The inventive apparatus comprises a plurality of devices, and further comprises networking means for the devices. Each device includes an electrical sensor and a computer. Each device is paired with a corresponding circuit breaker. Each computer is capable of: (a) receiving sensory information from the corresponding electrical sensor, wherein the sensory information pertains to at least one location proximate the corresponding circuit breaker; (b) processing the corresponding sensory information into processed electrical current direction information; and, (c) receiving the corresponding processed current direction information which is generated by the remaining devices. Usually, the sensory information which is received by a computer from the computer's corresponding electrical sensor (i.e., from the electrical sensor included in the same device) pertains to at least two locations proximate the device's corresponding circuit breaker (i.e., proximate the circuit breaker with which the device is paired), wherein at least two such locations are on opposite sides of the corresponding circuit breaker. Frequently according to inventive practice, each device's computer has a memory and includes an embodiment of the present invention's software which resides in the memory; usually, each device's computer is individually equipped with identical or similar inventive software.

According to typical embodiments of this invention, the inventive apparatus is further capable of processing the cumulative processed electrical current direction information (i.e., the sum total of the device's own processed electrical current direction information together with all of the electrical current direction information respectively processed by the other networked devices) into processed fault identification information. Moreover, according to many inventive apparatus embodiments, the device's computer is further capable of regulating (controlling) the corresponding circuit breaker, based on the fault identification information. Furthermore, the devices of the inventive apparatus are preferably networked in a "self-corrective" fashion. For example, the present invention's networking means will typically include a plurality of network links, wherein each network link connects two inventive devices. Upon failure of any network link, each computer is capable of circumventing the failure so as to nevertheless effectuate the receiving of the corresponding processed current direction information which is generated by the remaining devices.

Some inventive embodiments provide computer means having a memory and including a computer program product (e.g., computer software) resident in the memory, while other inventive embodiments provide a memory having a computer program product resident therein, while still other inventive embodiments provide a computer program product which is capable of being resident in a memory or a memory of a computer means. According to usual inventive practice, the same or similar computer program product is resident in the memory of each of plural computer means. Generally in inventive practice, the computer program product comprises a computer useable medium having computer program logic recorded thereon for enabling a plurality of computer means to identify and to choose to isolate a state of defectiveness in an electro-mechanical system for transmitting a transmissible medium. The electro-mechanical system has a plurality of transmission cessation means. Each computer means has a transmission cessation means associated therewith. According to many inventive embodiments, the computer program logic comprises: (a) means for enabling each said computer means to process, into local defectiveness information, data relating to the associated transmission cessation means; (b) means for enabling each computer means to ascertain the state of defectiveness, based on the local defectiveness information; (c) means for enabling each computer means to process, into local transmission direction information, data relating to the associated transmission cessation means; (d) means for enabling each computer means to receive remote transmission direction information, wherein the remote transmission direction information includes an aggregation of the associated local transmission direction information respectively processed by every other computer means, and wherein every other computer means processes, into the associated local transmission direction information, data relating to the associated transmission cessation means; (e) means for enabling each computer means to ascertain the location of the state of defectiveness, based at least on the combination of the local transmission direction information and the remote transmission direction information; and, (f) means for enabling each computer means to determine whether the associated transmission cessation means should be activated.

Also according to many embodiments of this invention is a method for identifying and deciding whether to isolate a state of defectiveness in an electro-mechanical system for transmitting a transmissible medium. The electro-mechanical system has a plurality of transmission cessation means. The inventive method comprises: (a) associating a computer means with each transmission cessation means; (b) using each computer means to process, into local defectiveness information, data relating to the transmission cessation means associated therewith; (c) using each computer means to ascertain the state of defectiveness, based on the local defectiveness information; (d) using each computer means to process, into local transmission direction information, data relating to the transmission cessation means associated therewith; (e) using each computer means to receive remote transmission direction information, wherein the remote transmission direction information includes all of the local transmission direction information respectively processed by every other computer means of data relating to the transmission cessation means associated therewith; (f) using each computer means to ascertain the location of the state of defectiveness, based at least on the combination of the local transmission direction information and the remote transmission direction information; and, (g) using each computer means to determine whether the transmission cessation means associated therewith should be activated.

The present invention is applicable to any electro-mechanical distribution system, such as an electrical distribution system or a fluid (either liquid or gas) distribution system. A circuit breaker in an electrical distribution system would be analogous to a valve in a fluid distribution system. An electrical sensor (e.g., electrical current sensor and/or electrical voltage sensor) would usually be implemented in an electrical distribution system, whereas a fluid pressure sensor would usually be similarly implemented in a fluid distribution system. Although the present invention is primarily described herein in relation to electrical distribution systems, the ordinarily skilled artisan who reads this disclosure will understand how the present invention admits of application to a variety of electro-mechanical systems, whether involving electrical transmission or fluid transmission.

The present invention represents a marked improvement over prior methodologies of affording electrical protection for electrical power distribution systems. The methodology according to the present invention is significantly faster than the protective coordination schemes currently used by U.S. Naval ships and the electric utility industry. The present invention's "Integrated Circuit Breaker Protection" ("ICBP") software determines the location of the electrical fault within an electrical power grid, and communicates this information to sister devices for action. In short, the inventive software enables the rapid and automatic location and isolation of electrical failures, thus keeping vital electrical power systems operational.

The present invention's Integrated Circuit Breaker Protection (ICBP) software is contemplated for use aboard U.S. Navy ships to expedite shunt trips of AC zonal electric distribution system (AC ZEDS) protective devices in the event of either main bus faults or internal/downstream switchboard faults. The inventive Integrated Circuit Breaker Protection software is currently being installed in Multi-Function Monitor III (MFM III) production units for application on U.S. Navy ships (in particular, the U.S. Navy's DDG90AF ships). According to the U.S. Navy's envisioned application, each "Electric Power Monitoring" ("EPM") device is referred to as a "Multi-Function Monitor III" ("MFM III"). The U.S. Navy contemplates use of the present invention wherein the inventive software is installed in each of a number of EPM devices. At each EPM (MFM III) location, coordinated shunt trip decisions will be made using system-wide information generated by the inventive ICBP software of the same and other EPM (MFM III) devices.

Typical operation of an inventive Integrated Circuit Breaker Protection software system can be better understood by first comparing electrical power systems to fluid systems (liquid or gas) such as liquid water systems. Water systems and electrical systems are analogous in that the following components serve similar functions: (i) water pipes and electrical cables; and, (ii) water valves and circuit breakers. Water pipes each act as a conduit in which water flows, just as cables each provide a conduit in which electrical current flows. Water valves are used to control the flow of water in pipes, whereas circuit breakers are used to control the flow of electrical current in cables. Water valves are opened to allow water to flow, and are closed (shut off) to prevent water from flowing. Circuit breakers are closed to allow electrical current to flow, and are opened to interrupt the electrical circuit, thereby preventing the flow of current. Water flows in a certain direction, depending on the demand for water; similarly, electrical current flows in a certain direction, depending on the demand for power.

Let us imagine that a water pipe has burst and large amounts of water are flowing towards the ensuing hole in the pipe. In order to halt the flow of water, the valve closest to the damaged area of the pipe is closed, preventing any more water from escaping. By closing the valve closest to the damaged area of the pipe, one seeks to keep as many water customers as possible connected to the water main, upstream of the closed valve. For example, it would not be prudent to shut the water off at the main plant for a burst pipe in a remote neighborhood. Instead, it would be prudent to shut the water off as close to the burst pipe as possible, allowing a maximum number of water customers to remain in service.

A hole in a pipe is similar to an electrical fault on a cable. Water will flow towards the hole in the water pipe, just as electrical current will flow towards an electrical fault on a cable. The present invention's Integrated Circuit Breaker Protection software includes automated logic to open circuit breakers in the event of an electrical fault, thereby preventing the flow of electrical current and maximizing the number of electrical loads still connected in the electric plant.

Conventionally—that is, in the absence of inventive practice—a location (e.g., station or terminal) in an electric distribution system includes: (i) circuit-breaking means, for "breaking" a circuit (e.g., electrical switch means for breaking an electrical circuit); and (ii) electrical sensing means for determining the respective conditions (e.g., such as would be pertinent to thresholds relating to a fault or defect) existing, in the circuitry, adjacent to the circuit-breaking means on one or (usually) both sides of the circuit-breaking means. For instance, a location in an electric distribution system can include an electrical switch and at least one electrical measuring device (e.g., a voltmeter and/or an ampmeter) on each side of the electrical switch.

More recently, the U.S. Navy has associated with electric distribution systems a kind of digital apparatus, referred to by the U.S. Navy as an electric power monitoring (EPM) device or unit, which performs the electrical sensing means. An EPM unit is essentially a processor/controller which is equipped with a computer chip and computer software, and which acts as an electrical sensor. An EPM unit is capable of sensing an electrical fault condition (e.g., via sensing voltage and/or current) relating to either or (preferably) both sides of the circuit breaker. In accordance with the present invention, an EPM unit is inventively associated with an electrical distribution system so as to be further capable of sending signals providing electrical information (e.g., directional current information) to any or all of the remaining EPM units which are also inventively associated with the electrical distribution system.

According to typical embodiments of the present invention, each location in the electrical distribution system comprises the combination of a circuit breaking device and an inventive EPM device or unit. The EPM unit includes a computer and electrical sensing means (e.g., current sensing means and/or the combination of current sensing means and voltage sensing means). The computer includes a computer chip, a computer memory, computer software resident in the computer memory, an analog-to-digital converter, and controlling means relating to the corresponding circuit breaker. The EPM unit is provided with software in accordance with the present invention. Each EPM unit is associated with a circuit breaking device and effectively represents a kind of control unit. The present invention uniquely feature computer software which effectuates information gathering and processing not only locally (i.e., as to conditions adjacent to the circuit breaker) but also remotely (i.e., as to conditions adjacent to other, typically, all other, circuit breakers). The information is received from remote locations via a computer communications system or network such as Ethernet.

"Ethernet" is well known in the art, as it represents the most widely used "Local Area Network" ("LAN") technology. The original (and still popular) version of Ethernet supports a data transmission rate of 10 Mb/s. Newer versions of Ethernet, referred to as "Fast Ethernet" and "Gigabit Ethernet," support data transmission rates of 100 Mb/s and 1 Gb/s (1000 Mb/s), respectively. An Ethernet LAN has been variously known to use coaxial cable, special grades of twisted pair wiring, or fiber optic cable. Ethernet can support both "Bus" and "Star" wiring configurations. Typically, Ethernet devices compete for access to the network using an Ethernet protocol such as that which is referred to as "Carrier Sense Multiple Access with Collision Detection ("CSMA/CD")."

According to certain inventive applications contemplated by the U.S. Navy, each circuit breaker in the main electric plant has an associated MFM III unit, and each MFM III unit reads local voltages and currents in the electrical system to determine if a fault exists. If a fault is detected, each MFM III unit executes the present invention's Integrated Circuit Breaker Protection (ICBP) software. The present invention's Integrated Circuit Breaker Protection software first attempts to determine the direction of local fault current flows. Since it is desirable to maximize the number of electric loads still connected in the electrical system (e.g., maximizing the number of customers connected to a power system after the fault is isolated), the present invention's Integrated Circuit Breaker Protection software looks at fault current directions calculated and communicated by other MFM III units in the electrical system. System-wide fault event information is stored locally within each MFM III unit. The inventive ICBP software running in every MFM III unit examines what is occurring throughout the electrical system and determines where the fault is located. Once the location of the fault is determined, the inventive ICBP software determines whether its associated circuit breaker should be opened to help isolate the fault. If the circuit breaker is to be opened, the inventive ICBP software generates a shunt trip signal that is delivered by the MFM III unit to the circuit breaker for it to open.

The inventive process pertaining to the prospective inventive practice by the U.S. Navy, such process being fairly representative of typical embodiments of the present invention, essentially includes the following steps: (i) The MFM III unit reads in local voltages and currents; (ii) The MFM III unit analyzes these voltages and currents to see if a fault is detected in the electrical system; (iii) If a fault is detected, the inventive ICBP software is executed in the MFM III unit to determine the direction of electrical current flow; (iv) The inventive ICBP software organizes data related to electrical fault currents to allow the MFM III unit to pass this data to other MFM III units via Ethernet connections; (v) The MFM III receives data from other MFM III units in the electric plant and passes this data to the inventive ICBP software; (vi) Using data from other MFM III units as well as data generated locally within its own MFM III unit, the inventive ICBP software determines where the fault is located in the electrical system; (vii) The inventive ICBP software determines if it should generate a shunt trip signal to trip the local circuit breaker based on the fault location; (viii) If a shunt trip signal is generated by the ICBP software, the MFM III unit then sends this signal to the local circuit breaker so that it opens to isolate the electrical fault.

The utilization of the present invention's Integrated Circuit Breaker Protection (ICBP) software aboard U.S. Navy ships will expedite shunt trips of AC zonal electric distribution system (AC ZEDS) protective devices in the event of either main bus faults or internal/downstream switchboard faults. In accordance with such implementation of the present invention, the inventive ICBP software is installed in the aforementioned electric power monitoring (EPM) device, called the Multi-Function Monitor III (MFM III), where coordinated shunt trip decisions are made using system-wide information generated by the inventive ICBP software of the same and other EPM devices.

The U.S. Navy contemplates practicing the present invention using the MFM III unit hardware, which is the U.S. Navy's next-generation multi-function monitor. In accordance with the present invention, the MFM unit will be capable not only of importing local voltages and currents, but also of collecting system-wide information through communications with other MFM III units. The MFM III will then make a coordinated response to rapidly isolate a main bus fault in an effort to provide fight-through capabilities in a combat damage scenario.

In order to produce a coordinated response, the High Speed Relay (HSR) algorithm, developed by Barrons Associates Inc. (BAI), was originally utilized in the MFM III. Originally designed for radial distribution systems, the HSR algorithm is used only to provide fault detection status and calculate power levels used in other MFM III algorithms. The present inventor, a U.S. Navy employee, was tasked by the U.S. Navy to develop the additional MFM III logic algorithms necessary to take the HSR's raw power levels and fault detection statuses, and to generate system information necessary to initiate a coordinated shunt trip response among all MFM III units. The shunt trip actions allowed by the MFM III units during a fault event were dictated by Bath Iron Work's (BIW) "Integrated Protective Coordination System" ("IPCS") concepts, written by Mike Sieleman. This IPCS logic was transformed into the Integrated Circuit Breaker Protection (ICBP) software by the present inventor for use in the MFM III units. The inventive ICBP software, designed by the present inventor to inventively implement and improve upon the original IPCS concepts, includes the means to generate the system data used to make the shunt trip decisions in the MFM III.

The present invention's Integrated Circuit Breaker Protection software, when inventively implemented in the MFM III, allows coordinated shunt trip response among the AC ZEDS main bus-tie circuit breakers, during a casualty event on the main distribution system. A coordinated shunt trip response provides more rapid isolation times (under 100 ms), and the area of isolation is smaller than that achieved using autonomous logic of the MFM I. Smaller areas of isolation allow more load centers to remain connected to the main distribution system after isolation, reducing the need for bus transfers. By isolating the fault event more quickly, the ability of critical combat loads to ride-through a fault event increases, thus potentially improving overall mission capabilities during combat scenarios. Also, faster fault isolation will lessen the effects of electrical fires that may be initiated by fragments impacting energized cables. Finally, smaller areas of electrical isolation will provide a quicker assessment of actual fault location, allowing the ship's crew to take necessary actions for damage control and electrical plant reconfiguration, if necessary.

The present invention's Integrated Circuit Breaker Protection software is currently being experimentally utilized in the MFM III prototypes and will eventually be installed in production units for applications on DDG91 Class U.S. Navy ships. Nevertheless, in the light of this disclosure, how the present invention may be practiced in a variety of other applications will be readily apparent to the ordinarily skilled artisan. The inventive software disclosed herein is applicable to any AC ZEDS distribution system, with minor modifications, and can be implemented within or incorporated into future EPM-type devices where voltage and current monitoring is available.

Other objects, advantages and features of this invention will become apparent from the following detailed description of the invention when considered in conjunction with the accompanying drawings and appendices.

BRIEF DESCRIPTION OF THE APPENDICES

The following appendices, 56 pages total, together represent an embodiment of the Integrated Circuit Breaker Protection software (source code) in accordance with the present invention, and are hereby made a part of this disclosure:

Attached hereto marked APPENDIX A (29 pages) and incorporated herein by reference is that portion of the inventive ICBP software embodiment which represents the Fault Isolation Algorithms, including the Fault Direction algorithm, the Local Buffer Algorithm, the Topology algorithm, the Switchboard Fault Detection algorithm, the Bus Tie Fault Detection algorithm and the Shunt Trip algorithm.

Attached hereto marked APPENDIX B (5 pages) and incorporated herein by reference is that portion of the inventive ICBP software embodiment which represents the Data Update (DU) algorithm.

Attached hereto marked APPENDIX C (9 pages) and incorporated herein by reference is that portion of the inventive ICBP software embodiment which represents the Data Matching (DM) algorithm.

Attached hereto marked APPENDIX D (5 pages) and incorporated herein by reference is that portion of the inventive ICBP software embodiment which represents the Include Files (IF).

Attached hereto marked APPENDIX E (2 pages) and incorporated herein by reference is that portion of the inventive ICBP software embodiment which represents the Remote System Information Handling Routines (RSIHR).

Attached hereto marked APPENDIX F (6 pages) and incorporated herein by reference is that portion of the inventive ICBP software embodiment which represents the Initialization Routines (IR).

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 2A illustrates a "point-to-point" communication layout among the electric power monitoring units. FIG. 2B illustrates a "ring" communication layout among the electric power monitoring units.

DETAILED DESCRIPTION OF THE INVENTION

Figure 1:
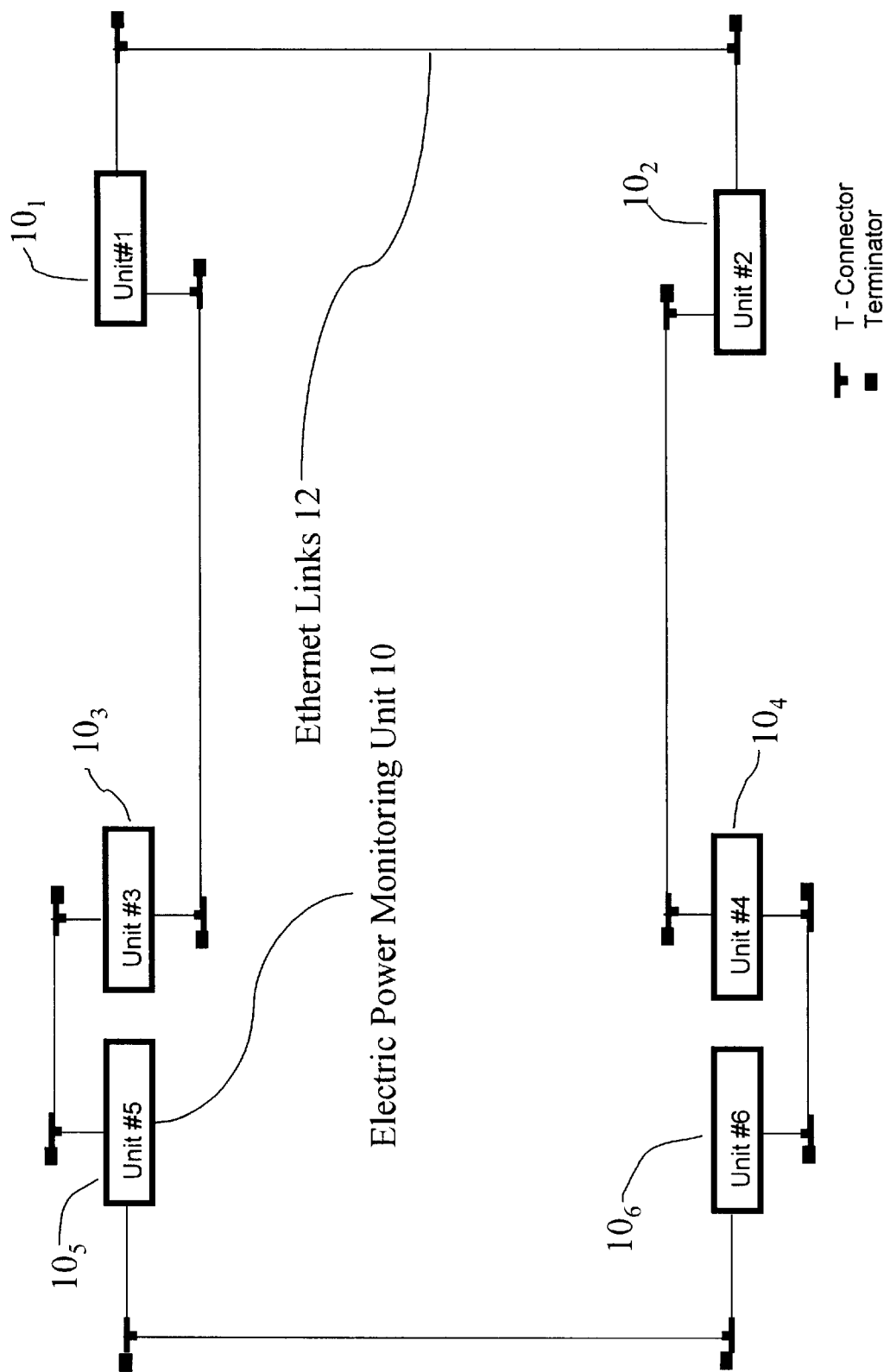
FIG. 1 is a schematic of an embodiment of an Integrated Circuit Breaker Protection (ICBP) system in accordance with the present invention, particularly illustrating a computer network system of several (six units shown) interconnected electric power monitoring units.

Referring now to FIG. 1, each electric power monitoring (EPM) unit 10 executes the present invention's Integrated Circuit Breaker Protection software. Circuit breakers 14 are disposed along electrical cable 16. Electric power monitoring units 10 are each paired with a corresponding circuit breaker 14.

FIG. 1 presents an example, in accordance with the present invention, of an Ethernet network of EPM units 10. FIG. 1 illustrates how the electric power monitoring units 10 are interconnected via Ethernet links 12. Six electric power monitoring units 10 are shown, viz., electric power monitoring unit 10, ("Unit #1"), electric power monitoring unit $10_2$ ("Unit #2"), electric power monitoring unit $10_3$ ("Unit #3"), electric power monitoring unit $10_4$ ("Unit #4"), electric power monitoring unit $10_5$ ("Unit #5"), and electric power monitoring unit $10_6$ ("Unit #6").

Electric power monitoring unit $10_1$ communicates with electric power monitoring unit $10_3$ and electric power monitoring unit $10_2$. If the Ethernet link 12 is broken between unit $10_1$ and unit $10_2$, unit $10_1$ can still obtain information about unit $10_2$ via other units 10. For example, unit $10_1$ will send information to unit $10_3$, whereupon unit $10_3$ unpacks this information, adds locally generated data to this packet of information, and re-sends the packet to unit $10_5$. This process continues over the other Ethernet links 12, so that unit $10_2$ will eventually receive information from unit $10_4$ that contains information originally generated by unit $10_1$.

Each unit 10 receives information regarding all other units 10 in the Ethernet communications system, and has a "global" picture of system status, e.g., as to which unit 10 has identified a fault, as to the direction of electrical currents, etc. Based on the global information, each unit 10 decides whether or not to open its adjacent circuit breaker 14 and isolate the fault event.

Figure 2A:
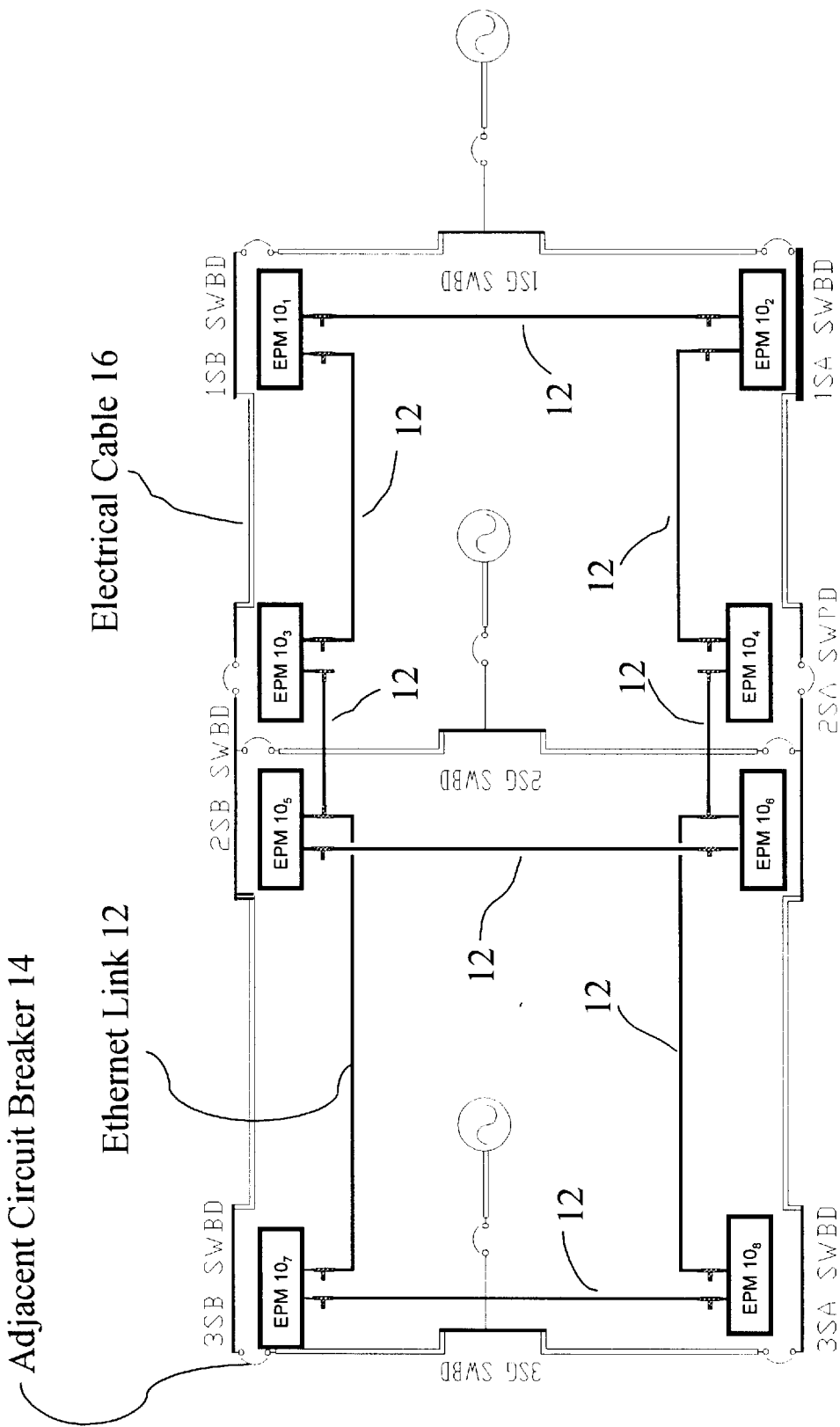
FIG. 2A and FIG. 2B are two similar schematics of respective embodiments of an Integrated Circuit Breaker Protection (ICBP) system in accordance with the present invention, each figure particularly illustrating a computer network system of several (eight units shown in FIG. 2A; eleven units shown in FIG. 2B) interconnected electric power monitoring units.
Figure 2B:
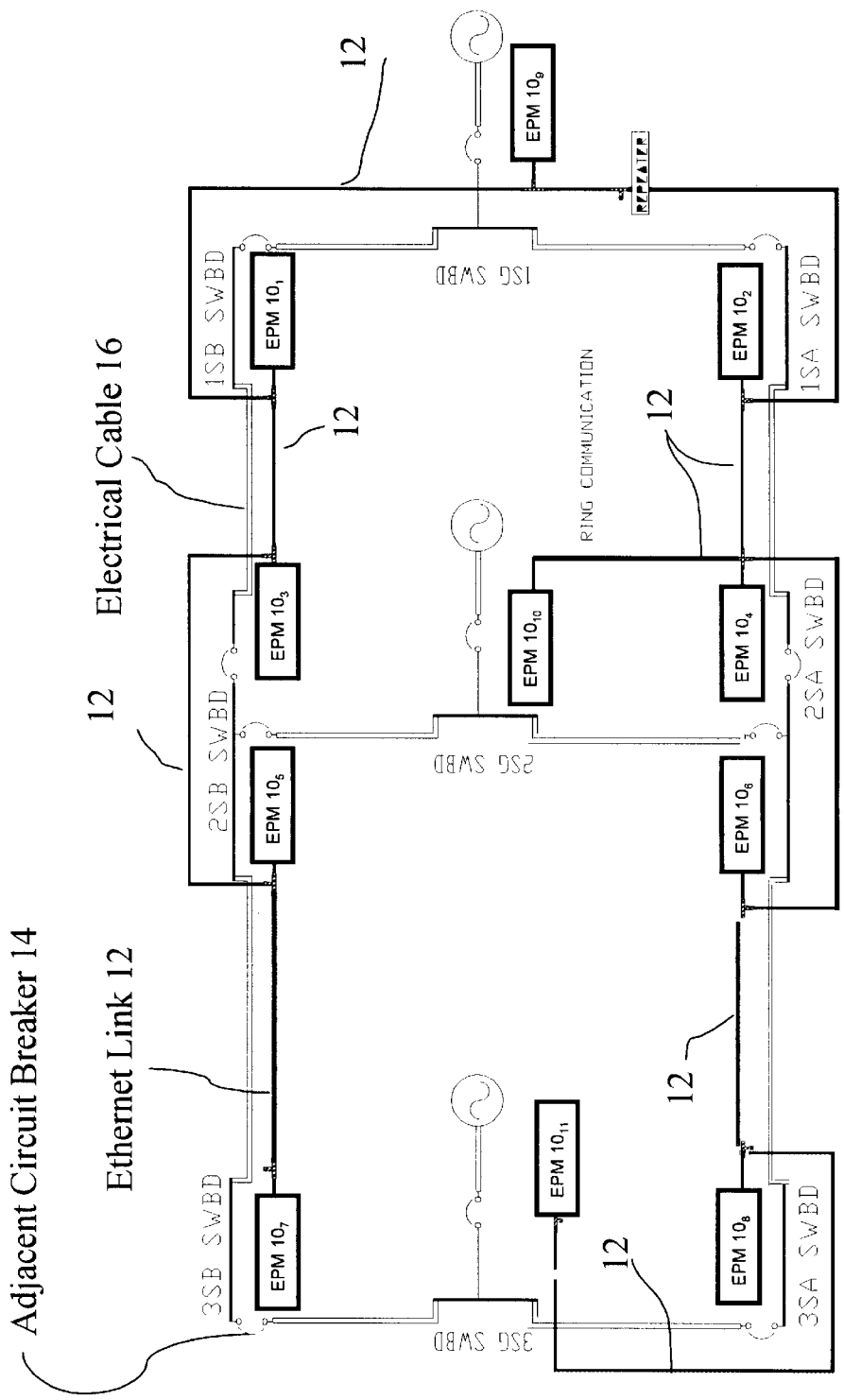

With reference to FIG. 2A and FIG. 2B, shown are two possible configurations of communication among the units 10. FIG. 2A shows a point-to-point communication layout among the MFM III units 10. FIG. 2B shows a ring communication layout among the MFM III units 10.

The U.S. Navy is planning to test the present invention by installing an inventive prototypical system aboard one or more Navy vessels. According to such plan, each electric power monitoring unit 10 will be a "Multi-Function Monitor III" ("MFM III") unit. One Multi-Function Monitor III unit 10 is installed for each circuit breaker 14 in the shipboard main electric plant.

Figure 3:
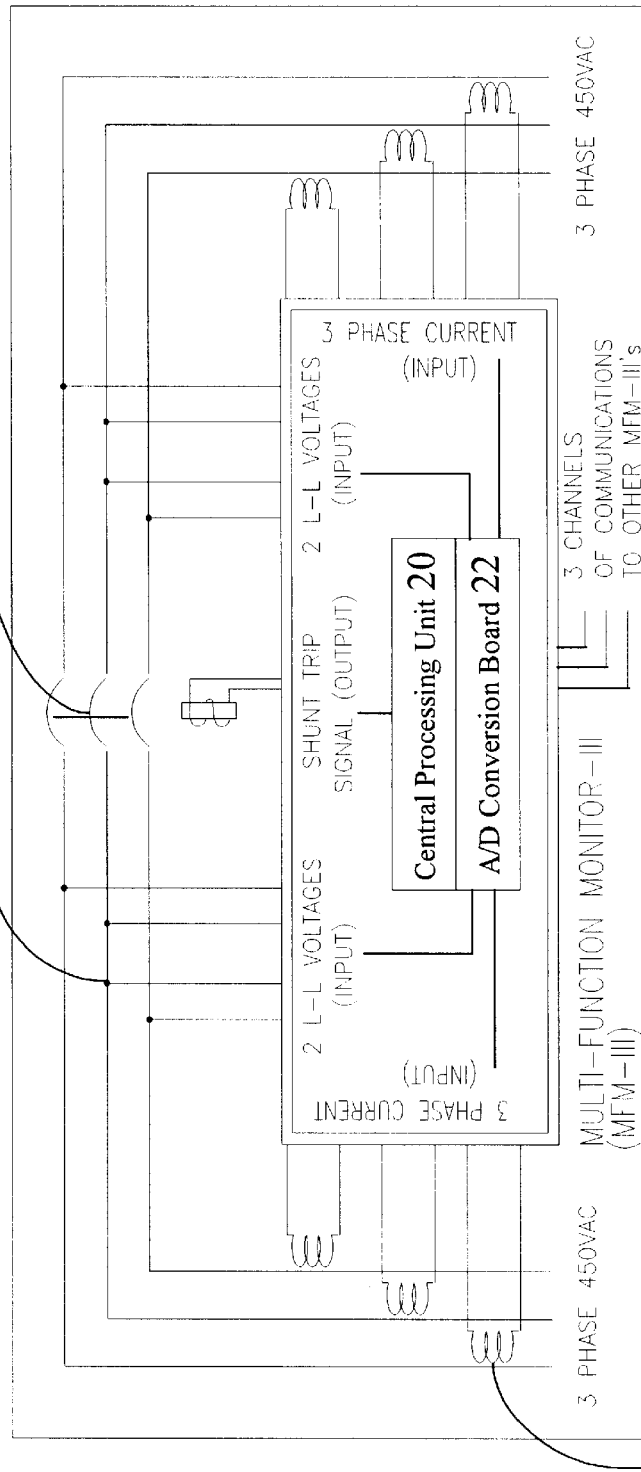
FIG. 3 is a circuit diagram of an embodiment, in accordance with the present invention, of the combination of an electric power monitoring unit and a circuit breaker.

Reference is now made to FIG. 3, which shows a functional diagram of a single MFM III unit 10. Two sets of line-to-line voltages 16 and two sets of line currents 18 are inputted into the unit 10 device, which includes a processor 20. The present invention's Integrated Circuit Breaker Protection software is resident in the memory of processor 20. An A/D (analogue-to-digital) conversion board 22 included within the MFM III unit 10 and made a part of or associated with processor 20 samples the analog voltage and current waveforms and converts them to digital waveforms for use in the inventive software of MFM III unit 10. These signals are processed first by the "High Speed Relay" ("HSR") algorithm written by Barron and Associates Inc. The HSR algorithm, also resident in the memory of processor 20, examines the voltage signals and determines if a fault exists in the electrical system.

Figure 4:
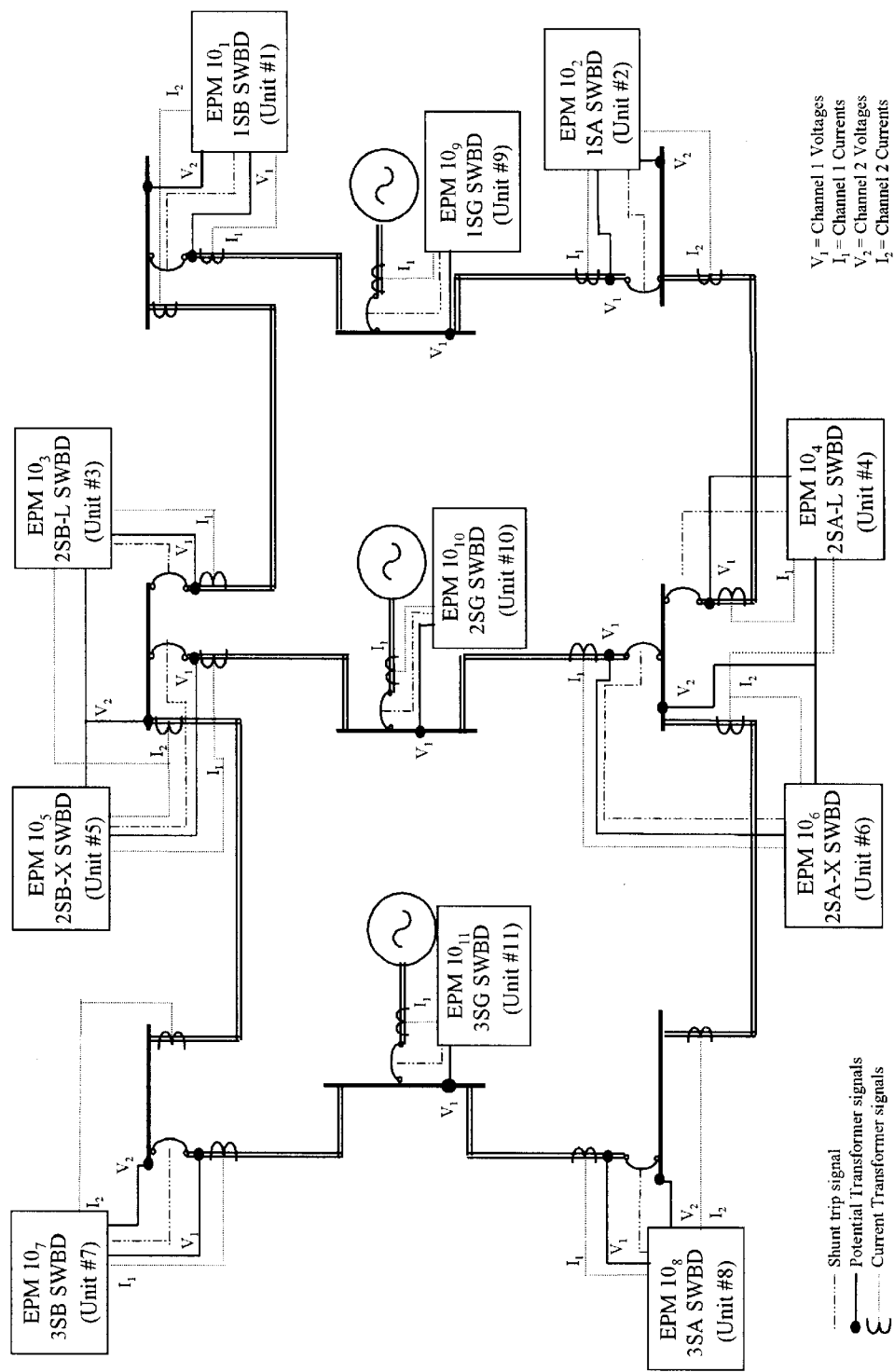
FIG. 4 is a schematic of an embodiment (similar to the embodiment shown in FIG. 2B) of an Integrated Circuit Breaker Protection (ICBP) system in accordance with the present invention, particularly illustrating the addressing, locations and signal inputs of several (eleven units, as shown) electric power monitoring units, each of which is connected to its corresponding circuit breaker.

Still referring to FIG. 3 and also referring to FIG. 4, each MFM II unit 10 is in connection with its corresponding circuit breaker 14, which are operatively situated in the electrical path of electrical cable 16. If a fault is detected by the HSR algorithm, the present invention's Integrated Circuit Breaker Protection software is responsible for determining where the fault is located and generating a shunt trip signal to open the adjacent circuit breaker 14. FIG. 4 shows the MFM III unit 10 addressing, locations and signal inputs for what is conceived to be typical U.S. Navy shipboard installation.

Each MFM III unit 10 determines fault current directions locally in the inventive Integrated Circuit Breaker Protection software. The local data is matched with remote information to determine the fault location based on fault current directions. If a fault is determined to be adjacent to the local MFM III unit 10, the inventive Integrated Circuit Breaker Protection software will generate a shunt trip signal to send to the adjacent circuit breaker 14. If the inventive Integrated Circuit Breaker Protection software fails to generate a shunt trip signal during the fault event, back-up autonomous software will eventually generate an autonomous shunt trip signal based on overcurrent magnitude and current directions. Integrated shunt trip signal generation is designed to occur within 10 ms, while the backup autonomous shunt trip signal generation may take up to 400 ms.

Figure 5:
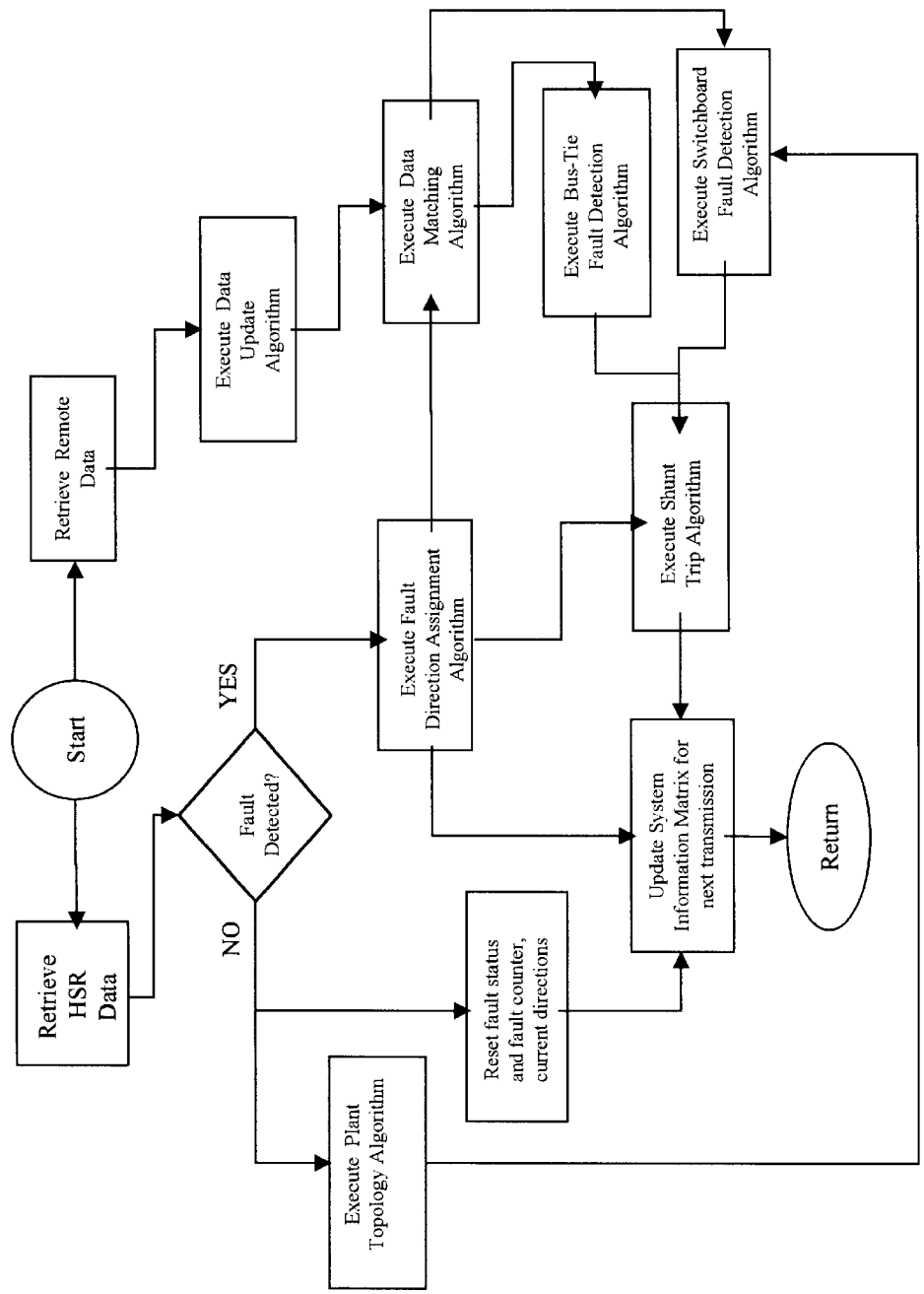
FIG. 5 is a flow diagram illustrating an embodiment of Integrated Circuit Breaker Protection software (ICBP) in accordance with the present invention, particularly illustrating inventive ICBP software such as that which is contained in APPENDIX A through APPENDIX E.

Reference is now made to FIG. 5, which provides an overview of the interconnections or interrelationships between and among the various algorithms of a representative embodiment of the present invention's Integrated Circuit Breaker Protection (ICBP) software. Every 1.0 ms, the Integrated Circuit Breaker Protection Software retrieves data from the HSR algorithm to determine if a fault exists. If a fault exists, the fault direction assignment routine is executed and the system information matrix is updated with fault data. Information is made available to the shunt trip and data matching algorithms. If a fault does not exist, various fault flags are reset and the system information matrix is updated. Also, the electric plant topology is determined and made available to the switchboard fault detection algorithm.

Also every 1.0 ms, the Integrated Circuit Breaker Protection Software organizes remote information received within the last millisecond. The data update routine uses this remote data to update the local system information matrix which is then utilized by the data matching routine. The data-matching algorithm is executed and provides matched fault data sets for both the bus-tie and switchboard fault detection algorithms. Shunt trip flags from these two algorithms are then available to the shunt trip algorithm routine along with the latest direction assignments from the fault direction algorithms, and a final shunt trip decision is made. The shunt trip flag is used to update the system information matrix which is now completely updated for this millisecond execution and ready for transmission to remote MFM III units.

The present invention's Integrated Circuit Breaker Protection software can be separated into two functional blocks of code, namely, (a) fault isolation and (b) data management.

(a) Fault Isolation Software

The fault isolation algorithms can be separated into several distinct routines that are executed every 1.0 ms. These major routines, referred to by function, are (i) Fault Counter and Direction Assignment, (ii) Topology Assessment, (iii) Switchboard Fault Detection, (iv) Bus-Tie Fault Detection, and (v) Shunt Trip.

(i) Fault Counter and Direction Assignment.

(See pages A-1 to A-9 of APPENDIX A.) If a fault is detected by the HSR algorithm (CT flag is 1, 2, or 3), for either channel 1 or channel 2, a fault detect flag, called FAULTDETECT, is set to "1" otherwise FAULTDETECT is set to "0". When FAULTDETECT is "1", the IPCS software starts an incremental fault counter, called FAULTCOUNT, and attempts to determine the directions of the fault current for both channel 1 and 2. Since all MFM III units in the electrical system will detect a fault event at approximately the same time, the fault counter is used as a "time stamp." The time stamp allows remote data, consisting of fault directions, circuit breaker status, and current magnitude flags, to be matched with equivalent local data sets for the fault detection routines. Due to hardware limitations of the MFM III, the maximum fault counter allowed is "5 11" to keep the size of the system information matrix to a minimum.

In addition to an incremental fault counter, a fault reset flag, called FAULTRESET, is set indicating that a previous fault condition existed but is no longer detected. This flag is set high (1) for five samples when a reset of the fault condition occurs; otherwise, FAULTRESET is set low (0).

In order to establish fault current directions, it is not possible to simply assign power direction as forward (+1) if POWER is positive and reverse (−1) if POWER is negative. The value of POWER may oscillate around zero during very low impedance faults. Instead, the POWER output of the HSR algorithm is used to calculate average fault power levels, AVEPOW.

Once a fault is detected, a pre-fault steady state power level is set, called SSPWR, and POWER is averaged during the entire fault event. If the following condition is met,

|AVEPOW-SSPWR|>=|SSPWR*POWMAG| with POWMAG currently set to 1.0 for DDG91 applications, an attempt is made to establish fault current directions.

If (AVEPOW<LOWNEGPOW), direction is assigned as −1. If (AVEPOW>LOWPOSPOW), direction is assigned as +1. If AVEPOW falls between LOWNEGPOW and LOWPOSPOW, no direction is assigned. Through DDG91 computer simulation studies, optimal settings for LOWNEGPOW and LOWPOSPOW were determined to be −0.025 and 0.025, respectively. Also, the optimal setting for the threshold POWMAG was determined to be 1.0. These three thresholds are necessary to eliminate false direction assignment especially during line-to-line fault events. (Future hardware studies may dictate more appropriate levels than those determined through DDG51 FLT IIA computer simulations.)

When shunt trips originate from any of the eleven MFM III units, direction assignment is suppressed for a target window surrounding the anticipated opening times of the circuit breakers. As the circuit breaker opens, voltage and current transients produce unpredictable power characteristics that may lead to false current directions. The target window is currently set for 20 ms after the first shunt trip time until 70 ms after the largest recorded shunt trip time, specifically set for the approximate 55 ms opening time of the ACB-4000 circuit breaker. If only one shunt trip is detected, direction assignment will be suppressed for a 50 ms window. For example, a shunt trip is detected at 6 ms. Direction assignment is suppressed starting at a fault counter of 26 and ending at fault counter 76. If two shunt trips are detected at 8 ms and 10 ms, the average power calculations are suppressed starting with fault counter 28 and ending at fault counter 80.

In some plant configurations, there may be negligible fault current flowing through some of the MFM III's current transformers, resulting in no fault direction assignment. For example, if only the IS generator is supplying power to all starboard load centers, a bus-tie fault between the 1SA and 2SA switchboards would result in substantial current flowing through the longitudinal 1SA switchboard CT, but negligible fault current flowing through the 2SA longitudinal CTs. Low fault power levels detected by the 2SA-L MFM III may result in no fault current direction assignment. The present invention's Integrated Circuit Breaker Protection Software must then rely on current magnitude comparisons for proper fault isolation in this example by examining current magnitudes flowing in the longitudinal 1SA and 2SA-L CTs.

Using the modified HSR output of current magnitude, IMAG, an average fault current is calculated for the fault event. If during the fault event, the average current magnitude falls below a low current threshold, LOWIPU, set at 0.10 per unit, then the current magnitude flag, AVEIMAG, is set to "1". If during the fault event, the average current magnitude exceeds a high current threshold, HIGHIPU, set at 2.0 per unit, AVEIMAG is set to "2". If during a fault event, the average current magnitude falls between HIGHIPU and LOWIPU or falls below a low current threshold, LOWCURRENT, set at 0.01 per unit, AVEIMAG is set to "3". If no fault is detected, AVEIMAG is set to (ii) Topology Assessment.

(See pages A-9 to A-12 of APPENDIX A.) The topology of the ship's electric plant is determined locally by each MFM III during "no fault" conditions (i.e., local fault detection is 0). Each MFM III utilizes circuit breaker status information received directly from other generator and distribution MFM III units. If an adjacent circuit breaker is closed, an MFM III will set its local circuit breaker status flag to "1". If an adjacent circuit breaker is open, an MFM III will set its local circuit breaker status flag to "0". This information is stored in the system information matrix that is passed via Ethernet links to other MFM III units.

According to "DDG51 CLASS ELECTRICAL PLANT PROTECTIVE DEVICES APPL AND COORDINATION" (NAVSEA drawing no. 303-6567496, REV B), a "standard operating configuration for the Zonal Electrical Distribution System (ZEDS) is to have two generators on-line, the cross-tie breakers of the on-line generators closed, and the cross-tie breakers of the off-line generators open." All other configurations are considered non-standard. However, for proper switchboard fault isolation, an additional configuration considered a "standard configuration" is a double ring, with all cross-tie circuit breakers closed but only two generators on-line. The topology assessment routine sets a standard configuration flag, STDCONFIG, to "1" if true and "0" if false.

(iii) Switchboard Fault Detection.

(See pages A-12 to A-21 of APPENDIX A.) In order to establish if a switchboard fault exists, local fault current directions and circuit breaker status are examined to see if current directions indicate power flowing into the switchboard. Current directions and circuit breaker status must indicate that a switchboard fault condition exists for a given number of samples called NSWBDSAMPLE before a switchboard fault flag is set to "1". This local switchboard fault flag is called SWBDFLT.

The Integrated Circuit Breaker Protection Software allows the MFM III units to provide proper isolation of a switchboard fault only if operating in a standard electric plant configuration (STDCONFIG is "I") and only if one switchboard fault is detected in the entire electrical system. Therefore, the total number of switchboard faults is calculated by summing the switchboard fault detection flags received from other MFM III units. The number of switchboard faults is calculated for a given number of samples, called NSWBDCOMM, corresponding to worse case communication delays. If only one switchboard fault is detected anywhere in the electric plant within a predefined window and the electric plant is in a standard configuration, shunt trip action is taken locally only if certain plant topology and on-line generator conditions are met. However, if more than one switchboard fault is detected or if a shunt trip was initiated by the autonomous back-up MFM-I algorithms, including the over-current directional, reverse power, and overpower relay routines, switchboard shunt trip decisions are inhibited.

The samples, NSWBDCOMM and NSWBDSAMPLE, were determined through computer simulations of the DDG91. These samples are presently set at 2 for NSWBDSAMPLE and 8 for NSWBCOMM. Since the algorithm is executed every 1.0 ms, these samples correspond to 2.0 ms and 8.0 ms delays.

(iv) Bus-Tie Fault Detection.

(See pages A-21 to A-25 of APPENDIX A.) The present invention's Integrated Circuit Breaker Protection Software allows the MFM III to provide proper isolation of bus-tie faults for both standard and non-standard electric plant configurations. Bus-tie fault detection can be based on a combination of fault current direction and circuit breaker status or solely on fault current magnitude flags for longitudinal bus-tie faults.

In order for a bus-tie fault to be detected based on fault current direction, local and remote fault current directions must indicate that power is flowing out of the switchboard at both ends of the bus-tie. For a bus-tie fault to be detected based on local fault current direction and remote circuit breaker status, local fault current directions must indicate that power is flowing out of the switchboard towards the other end of the bus-tie with an open circuit breaker.

In order for a bus-tie fault to be detected based on comparisons of fault current magnitude flags, the bus-tie fault detection routine compares local current magnitude flags with appropriate remote current magnitude flags to determine if a longitudinal bus-tie fault exist. If the local current magnitude flag is "1" and the remote current magnitude flag is "2" for a longitudinal bus, or if the local current magnitude flag is "2" and the remote current magnitude flag is "1" for a longitudinal bus, a bus-tie fault flag is set to "1". Such a disparity in the fault currents entering a bus-tie (greater than 2.0 per unit) versus fault currents exiting the same bus-tie (less than 0.01 per unit), indicates that a fault exists somewhere on that bus-tie. Cross-tie fault detection cannot use comparisons of the current magnitude flags due to generator contributions to the fault current flowing into the cross-tie.

As with switchboard fault detection flags, bus-tie fault flags are not set until the condition lasts for a given number of samples. For bus-tie fault detection based only on fault current directions or on fault current magnitudes, the bus-tie fault must be detected for NBTSAMPLE. For bus-tie fault detection based in part on circuit breaker status, the bus-tie fault condition must be detected for NCBSAMPLE. Again, these samples, NBTSAMPLE and NCBSAMPLE, were determined through computer simulations of the DDG91, and are presently set at 2 and 4, respectively. Since the algorithm is executed every 1.0 ms, these samples correspond to 2.0 ms and 4.0 ms delays. Future hardware studies may dictate more appropriate delays than those determined through DDG91 computer simulations.

Once a bus-tie fault condition exists for either NBTSAMPLE or NCBSAMPLE, a shunt trip flag called STCT_DIR or STCT_MAG, respectively, is set to "1". These bus-tie fault flags are then passed into the shunt trip algorithm for a final shunt trip decision.

(v) Shunt Trip.

(See pages A-25 to A-29 of APPENDIX A.) The shunt trip algorithm utilizes shunt trip flags from the switchboard fault detection and bus-tie fault detection sections of the ICBP software as well as the shunt trip flag from the autonomous back-up MFM-I algorithms, including the overcurrent directional, reverse power, and overpower relay routines. Using the bus-tie shunt trip flags, the shunt-trip algorithm performs one additional check using local information to determine if the bus-tie fault still exists. Shunt trip flags, STCT1 and STCT2, are used to indicate that a shunt trip decision has been made based on channel #1 or #2 information, respectively. If either STCT1 or STCT2 are set to "1" or if the shunt trip flag, STSWBD, sent from the switchboard fault algorithm is set to "1", the final shunt trip signal called STACB is set to "1". STACB is the signal that is ultimately used to shunt trip the ACB circuit breaker.

(b) Data Management Software

The present invention's Integrated Circuit Breaker Protection Software's data management is separated into two routines, namely, (i) the Data Update algorithm, and (ii) the Data Match (or Matching) algorithm.

(i) Data Update Algorithm.

(See APPENDIX B.) The MFM III sends out a complete 11 by 15 matrix of system information over both the point-to-point and ring Ethernet connections. The Ethernet package is broadcast on both the ring and point-to-point connections for all connected MFM III units to receive. Broadcast messages are sent on the point-to-point connections since some point-to-point connections must send/receive information to two connected MFM III units. For example, the point-to-point connection between the 2SA and the 3SA includes three MFM III units.

Regardless of whether a matrix is received over the ring or point-to-point ports, the incoming matrix is treated identically. The receiving MFM III downloads the incoming matrices into a specific memory location, based on where the matrix originated from, and updates its own local system information matrix using the remote data. At the end of every 1.0 millisecond interval, the IPCS algorithm generates a new row of local information, updates the local system information matrix with this row, and broadcasts the local system matrix to all connected MFM III units through both point-to-point Ethernet ports. At the end of every 5.0 millisecond interval, the local system matrix is broadcast over the ring and both point-to-point Ethernet ports. A more detailed explanation of how incoming data is handled follows.

As a system information matrix is received from any of the three Ethernet ports, the information is stored in a 11×11×15 remote system information buffer called REM_SYSINFO. The address from where the information originated is used to store the incoming matrix in the appropriate location of REM_SYSINFO. For example, if MFM III #2 sends a packet of information to MFM III #4, MFM III #4 will store the received information in the second 11×15 buffer region of REM_SYSINFO. There is also an eleven element vector called REM_UPDATE which keeps track of where information originated within the last 1.0 ms, i.e. for the above example, the second row of REM_UPDATE is set to "1" to reflect information received directly from MFM III #2.

If an MFM III receives a matrix during the execution of the HSR, Integrated Circuit Breaker Protection Software, or MFM1 algorithms, these algorithms may be interrupted only to store the incoming matrix into REM_SYSINFO for later use by the data update routine. However, the HSR, Integrated Circuit Breaker Protection Software and MFM1 algorithms may not be interrupted to update the local system information matrix with data stored in REM_SYSINFO. The local system information matrix must wait to be updated with the remote information at the next 1.0 ms execution of the data update routine just before the next execution of the HSR, ICBP and MFM1 algorithms.

The data update routine uses the information stored in REM_SYSINFO and REM_UPDATE to appropriately modify the rows of the local system information matrix, SYSINFO, with remote information. When REM_UPDATE is "1" for any row, only the row in SYSINFO corresponding to the location from where the incoming matrix originated is automatically updated. Also, rows of REM_UPDATE set to "1" indicate what matrices were received within the last 1.0 ms. Only these newly received matrices stored in REM_SYSINFO will be examined for updates to remaining rows of SYSINFO. For example, MFM III #1 receives information from MFM III #2 and MFM III#4 within the last 1 ms. The second and fourth elements of REM_UPDATE will be set to "1" and all other elements will be "0". The second and fourth row of SYSINFO matrix of MFM III #1 will automatically be updated using the information stored in row 2 of the second 11×15 buffer location of REM_SYSINFO and the information stored in row 4 of the fourth 11×15 buffer location of REM_SYSINFO. No other updates to rows 2 or 4 of SYSINFO will be allowed in this pass through the data update routine. The information stored in the remaining rows of the second and fourth 11×15 buffer locations of REM_SYSINFO will be used for updates to rows 3 and 5 through 11 of SYSINFO.

In non-fault conditions, updates to the rows of local system information matrix can occur only when information is received directly from the source for that row. The only means of receiving system-wide information directly from the source is through ring Ethernet transmissions. If any of the MFM III units are not properly transmitting data over their ring Ethernet ports or if the ring Ethernet is down, system topology can not be determined during non-fault conditions. In fact, the topology algorithm is only executed during non-fault conditions. Therefore, if any MFM III does not receive information from all other MFM III units over the ring Ethernet or adjacent point-to-point Ethernet links during non-fault conditions, correct topology can not be determined. Since the switchboard fault detection algorithm requires knowledge of the system topology prior to making a shunt trip decision, incorrect topology will prevent shunt trip decisions for switchboard fault detection. This implies that regular checks as to the health of the Ethernet network should be made using a network analyzer to ensure all units are communicating.

During fault conditions, updates are based on fault counters, fault reset flags, and fault detection flags. As in non-fault conditions, when REM_UPDATE is "1" for any row, only the row corresponding to the location from where the incoming matrix was sent is updated, and no further updates to these rows of SYSINFO will be allowed in this pass through the data update routine. In order for other rows to be updated in the SYSINFO matrix, comparisons are made between the stored values for FAULTCOUNT, FAULTRESET, and FAULTDETECT in the SYSINFO versus the REM_SYSINFO matrices. If an incoming matrix has a row where FAULTDETECT is "1" and a new fault counter that exceeds the previously stored fault counter for that row in SYSINFO, and the previously stored row shows that a fault condition was not reset, that row will be updated in SYSINFO. If an incoming matrix contains a row where FAULTRESET is "1" and FAULTCOUNT is "0", and the previously stored data for that row shows FAULTDETECT is "1" and a non-zero FAULTCOUNT, that row will be updated in SYSINFO. Also, further updates for that row are prevented in this pass through the data update routine. If an incoming matrix contains a row where FAULTRESET is "0" and FAULTCOUNT is "0", and previously stored data for that row shows FAULTRESET is "1" and FAULTCOUNT is "0", that row will be updated in the local system matrix. Again, further updates for that row are prevented in this pass through the data update routine.

Once execution of the data update routine is complete, the local row to the system information matrix is updated in the following execution of the Integrated Circuit Breaker Protection Software. After Integrated Circuit Breaker Protection Software execution is complete, the local system information matrix is then broadcast back out over the Ethernet links for use by other MFM III units.

During the development of the MFM III, suggestions were made to pass rows of information instead of an entire matrix of information. Each row of information consists of 32 bits (4 bytes) of information while an entire matrix of information consists of 352 bits (44 bytes) or data. Either the row or matrix would require the minimum Ethernet packet size of 64 bytes for the data field; therefore, the message length would be as long for a row as for an entire matrix. However, passing only rows of information would greatly increase the Ethernet traffic seen on point-to-point connections. Since the MFM III communications boards were originally designed to run with a 10Base2 Ethernet (10 Megabits per second), traffic associated with passing rows on the point-to-point connections would result in unacceptable utilization rates. In fact, the 5.0 ms ring transmission rates are based on keeping low utilization rates on the ring with eleven MFM III units sending a packet of information. Since the content of the system information matrix was designed to be packaged within one Ethernet packet of information, each MFM III only needs to send one Ethernet packet on each point-to-point link every 1.0 ms. The 1.0 ms point-topoint transmission rate keeps traffic to a minimum and utilization rates low, thereby keeping the probability of collisions among Ethernet packets low and preventing delays in transmission times.

(ii) Data Matching Algorithm.

(See APPENDIX C.) The data matching algorithm, executed every 1.0 ms following execution of the data update routine, generates matched data sets for a given fault counter. Based on its local address and type, the MFM III knows what information is needed to make a local shunt trip decision through a look-up table. For example, the MFM III #2 needs to compare its local channel 1 information with remote channel 1 information from MFM III #1 to isolate a cross-tie fault between the 1SA and 1SB switchboards. The MFM III #2, needs to compare its local channel 2 information with remote channel 1 information from MFM III #4 to isolate a forward longitudinal fault between the 1SA and 2SA switchboards.

In order to obtain matched data sets, the two local buffer matrices are filled with information including, fault counter, circuit breaker status, fault current directions for channel 1 and 2, and current magnitude flags for channel 1 and 2. At the beginning of each fault event, sixteen samples of data are stored within the local buffer matrix for matching attempts with remote data. As the buffer fills, the oldest sample is replaced by the latest sample, keeping the most recent sixteen samples continually stored within the local data buffer. The local buffer routine is actually located at the end of the Fault Counter and Direction Assignment section of the ICBP software.

A remote buffer of fault data is filled in the data match algorithm. The remote fault data matrix, called REMOTE_MFM is a 3×16×4 matrix. The first dimension represents the first, second, or third remote MFM III supplying the data. At least three sources of data are required since both the 2S and 3S cross-tie MFM III units require matched data sets from three remote MFM III units. All other MFM III units only require matched data sets from two remote MFM III units. Specifically, the 3S MFM III units need information from their adjacent cross-tie MFM III units for cross-tie fault shunt trip decisions and information from both MFM III units located at the 2S switchboards to make a shunt trip decision for a longitudinal bus-tie fault. The 2S cross-tie MFM III units require information from the 2S longitudinal MFM III units to determine if a switchboard fault exists in addition to information from the 3S MFM III units and their adjacent 2S cross-tie MFMIIIs. All other MFM III units need only information from two remote MFM III units. The second dimension of REMOTE_MFM represents sixteen samples of data, continuously updated with the most recently received samples. The third dimension represents the four types of data stored, fault counter, fault direction, circuit breaker status, and current magnitude flag.

The data matching routine generates three sets of matched data ultimately used by the bus-tie and switchboard fault detection sections of the Integrated Circuit Breaker Protection Software. Each set of data is matched for a given fault counter. The first set of data consists of the variables LOCALCT1, LOCALIMAG1, REMOTECT1, REMOTECB1, and RMTIMAG1. This data is used for shunt trip decisions based on channel 1 data of the local MFM III. The variables LOCALCT1 and LOCALIMAG1 are generated by the local channel 1 data and store the direction of the fault current and the current magnitude flags, respectively. The variable REMOTECT1 stores the direction of the remote fault current to be compared with LOCALCT1. Note that this does not necessarily correspond to the channel 1 information of the remote MFM III. For example, MFM III #4 compares its channel 1 information with channel 2 information of MFM III #2; in this case, REMOTECT1 is actually the direction of current in channel 2 of MFM III #2. The variable REMOTECB1 stores the status of the remote circuit breaker to be compared with LOCALCT1, and the variable RMTIMAG1 stores the remote current magnitude flag to be compared with LOCALIMAG1The second set of data consists of the variables LOCALCT2, LOCALIMAG2, REMOTECT2, REMOTECB2, and RMTIMAG2. This data is similarly used for shunt trip decisions based on channel 2 data of the local MFM III.

The third data set consists of the variable THIRDCT. This variable is utilized only in the switchboard fault detection algorithm for determining faults at the 2S switchboards. The 2S cross-tie MFM III units, not the 2S longitudinal MFM III units, are responsible for generating an appropriate flag for a fault at the 2S switchboard. However, the 2S cross-tie MFM III units need to know the direction of the fault current in channel 1 of the 2S longitudinal MFM III units in order to determine if a 2S switchboard fault exists. THIRDCT provides fault current direction in the forward longitudinal 2S bus-tie matched with the direction of the local fault currents in channel 1 and channel 2 of the 2S cross-tie MFM III units to detect a switchboard fault at the 2S switchboards.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

APPENDIX A

```
/*                                                      APPENDIX A
; FILE:          mfm3ipcs.c
; DESCRIPTION:   MFM3 IPCS Algorithm
; Date: July 2000
; Rev K (previous rev J)
;
;   Naval Surface Warfare Center
;   Acoustic Trials Detachment
;   Attn: Tracy Hannon
;   740 Mullet Road
;   Cape Canaveral, FL 32940
;   (407-784-3645)
;
;
; ------------------------------------------------------------------
; The MFM3 IPCS Algorithm is executed every 1.0 ms and
; requires two sets of voltages and currents and local circuit
; breaker status as inputs and provides a shunt trip signal for
; an output.  The MFM3 IPCS Algorithm is divided into six separate
; routines as follows:
;                       (1) High Speed Relay Algorithm
;                       (2) Fault Direction Algorithm
;                       (3) Local Buffer Algorithm
;                       (4) Topology Algorithm
;                       (5) Switchboard Fault Detection Algorithm
;                       (6) Bus Tie Fault Detection Algorithm
;                       (7) Shunt Trip Algorithm
;
; Input Variables:
;
; Volts1[] : voltage set number 1, Vab,Vbc
; Amps1[]  : current set number 1, Ia, Ib, Ic
; Volts2[] : voltage set number 2, Vab,Vbc
; Amps2[]  : current set number 2, Ia, Ib, Ic
; cbstat   : circuit breaker status, 0==open, 1==closed
;
; Output Variables:
;
; st_acb    : signal to shunt trip acb circuit breaker
;           : 0 == no trip, 1 == trip
*/ include "ipcs.h"
include "math.h"

int IPCSMFM3(float Volts1[],float Amps1[],float Volts2[],
                        float Amps2[],int *cbstat){

/* (1) Beginning of HSR algorithm --------------------------------
;
;   Call Barron's High Speed Relay algorithm with
;   inputs of voltage and current and
;   outputs of ct,sum_pow,magn,power
;
;   Output Variables:
;
;   magn1/magn2     : magnitude of the system voltage in
```

APPENDIX A

```
;                       per unit
;   power1/power2    : instantaneous three-phase power in
;                       per unit
;   sumpow1/sumpow2  : sum or steady state powers using 16
;                       samples (per unit)
;
;   ct1/ct2          : fault status based on voltage and current
;                       sets 1 or 2.
;                       CT is an integer and is defined as
;                       follows:
;                       == 0 if changes in voltages and angles
;                             are within preset limits
;                       == 1 if voltage magnitude increases or
;                             decreases to beyond preset limits
;                       == 2 if angle between voltages changes by
;                             preset delta angle (in radians)
;                       == 3 if both (1) and (2) occurs
;                       == 4 if fault existed but no longer detected
;                             (resetting buffers)
*/{
  if(typemfm!=GENERATOR){
        ct1=hsrly(Volts1,Amps1,WS1_ptr,&sum_pow1,
                &magn1,&power1,&imag1);
        ct2=hsrly(Volts2,Amps2,WS2_ptr,&sum_pow2,
                &magn2,&power2,&imag2);
  }

}

/* End of HSR algorithm ----------------------------------
;
;   (2) Beginning of Fault Direction Algorithm -----------------
;
;   Input Variables:
;
;   ct1/ct2, sum_pow1/sum_pow2, magn1/magn2, power1/power2
;   as previously defined
;
;   typemfm    :  type of mfm, i.e. 1 == CORNER, 2 == STRAIGHT,
;                                   3 == INSIDE CORNER, 4 == GENERATOR
;   localmfm   :  unique number assigned to each MFM3's location:
;                 1 == 1SB-X, 2 == 1SA-X, 3 == 2SB-L, 4 == 2SA-L,
;                 5 == 2SB-X, 6 == 2SA-X, 7 == 3SB-X, 8 == 3SA-X,
;                 9 == 1SG,  10 == 2SG,  11 == 3SG
;
;   Nstartup   : counter from beginning of power up of MFM3
;
;   Local Variables:
;
;   cbopen       : flag for if local ACB is open
;   old_cbstat   : old status of local ACB breaker
;   new_cbstat   : new status of local ACB breaker
;   sspwr1       : steady state power prior to fault thru ct#1
;   sspwr2       : steady state power prior to fault thru ct#2
;   st_init[]    : flag for if shunt trip has occurred
;                   anywhere in the distribution system
;   nst_init[]   : fault counter for when shunt trip
```

APPENDIX A

```
;                   occurs in the distribution system
;   st_initflag  : flag to determine when suppression of average
;                    power calculations should occur
;   lowrange     : lowest fault counter for start of average
;                    power calculation suppression
;   hirange      : highest fault counter for end of average
;                    power calculation suppression
;   delta_range  : parameter necessary to reset lowrange in
;                    multiple fault scenarios
;   powsuppress  : ==1 if avepow calculations are suppressed
;                  ==0 if avepow calculations are not suppressed
;
;   powsum1      : sum of all power1 from start of fault event
;   powsum2      : sum of all power2 from start of fault event
;   Npowsum1     : number of power1 samples from start of fault
;   Npowsum2     : number of power1 samples from start of fault
;   avepow1      : calculated average 3-ph power thru ct1
;   avepow2      : calculated average 3-ph power thru ct2
;   avepowflag1  : flag to suppress calculation of avepow1
;   avepowflag2  : flag to suppress calculation of avepow1
;
;
;
;   Output variables:
;
;   sysinfo[][]  : system information matrix containing
;                    status of all MFM3s in the eletrical system
;   ig1          : status of local ACB circuit breaker
;   new_cbstat   : new status of local ACB breaker
;   close_acb    : flag for if local ACB is closed
;   fltdetect1   : flag for fault detected through ct#1
;   fltdetect2   : flag for fault detected through ct#2
;   faultdetect  : flag for fault detected through ct#1 or ct#2
;   faultcount   : counter started at beginning of fault event
;   faultreset   : flag to show that fault has cleared
;   ctdir1       : direction of fault current thru ct#1
;   ctdir2       : direction of fault current thru ct#2
*/ float aveimag1;
float aveimag2;
int avepowflg1;
int avepowflg2;
int min_nst_init;
int max_nst_init;
int i,j;

if(sysinfo[localmfm-1][TYPECOL-1]==GENERATOR){
      if(cbstat == 0)
        ig1=0;
      else
        ig1=1;
      sysinfo[localmfm-1][CBCOL-1]=ig1;
}
```

APPENDIX A

```
else{ if(!cbstat)
  ig1=0;
 else
  ig1=1;

sysinfo[localmfm-1][CBCOL-1]=ig1;

Nstartup++;

if(Nstartup > 9999)
  Nstartup=NSTART_MFM3+1;

if(Nstartup==1)
   new_cbstat=ig1;
else{
    old_cbstat=new_cbstat;
    new_cbstat=ig1;
}
 if((new_cbstat)&&(!old_cbstat))
     close_acb=1;
 else
     close_acb=0;

if((!ig1)&&(!cbopen)){
    cbopen=1;
 } sspwr1=sum_pow1/POWER_SZ;
        /*if((ct1==1)||(ct1==2)||(ct1==3)||(ct1==4))  */
            if(ct1!=0)
          fltdetect1=1;
        else
           fltdetect1=0;

sspwr2=sum_pow2/POWER_SZ;
        /*if((ct2==1)||(ct2==2)||(ct2==3)||(ct2==4))*/
            /*if(ct2!=0)*/
            if(ct2>0)
          fltdetect2=1;
        else
           fltdetect2=0;

if(Nstartup > NSTART_MFM3){
        if((fltdetect1)||(fltdetect2))
           faultdetect=1;
        else
           faultdetect=0;
}
        else{
             faultdetect=0;
            faultreset=0;
        } if((faultcount)&&(!faultdetect))
```

APPENDIX A

```
        fltrst_cnt=1;

/* added 6/30/99 to keep faultreset flag high for at
           least MAX_FLTRST samples */ if(fltrst_cnt)
        { if(fltrst_cnt<=MAX_FLTRST)
           {
             faultreset=1;
             fltrst_cnt++;
           }
           else
           { faultreset=0;
             fltrst_cnt=0;
           }
        }
        else
              faultreset=0;

if(faultdetect){
            faultcount++;
            if(faultcount>MAX_FLTCNT){
                faultcount=MAX_FLTCNT;
            return(faultcount);
            }
        }
        else
            faultcount=0;

sysinfo[localmfm-1][FLTCNT-1]=faultcount;
     sysinfo[localmfm-1][FLTCOL-1]=faultdetect;
     sysinfo[localmfm-1][FLTRST-1]=faultreset;

if(Nstartup>NSTART_MFM3){ if(faultdetect){

/* added 6/21/00 to address change in local cb status
      during fault event when breaker is not shunt tripped */
   if((old_cbstat)&&(!new_cbstat))cbstat_flag=1;
   if(cbstat_flag)cbstat_cnt++;

for(i=0;i<ACTIVEMFM3;i++){ if((sysinfo[i][CBSTCOL-1])&&(!st_init[i])&&(sysinfo[i][CBCOL-1])){
         st_init[i]=1;
         nst_init[i]=sysinfo[i][FLTCNT-1];
      }
   }
```

APPENDIX A

```
min_nst_init = 0;
max_nst_init = 0;
st_init_flag = 0;

for(j=0;j<ACTIVEMFM3;j++){ if(st_init[j]){ if(min_nst_init==0)
         min_nst_init=nst_init[j];
      if(nst_init[j]<min_nst_init)
         min_nst_init=nst_init[j];
      if(nst_init[j]>max_nst_init)
         max_nst_init=nst_init[j];

st_init_flag=1;
   }
 } if(st_init_flag){ lowrange=min_nst_init+LOWSUPPRESS;
      hirange=max_nst_init+HISUPPRESS;
      delta_range=2*(HISUPPRESS-LOWSUPPRESS)+1;

if((hirange-lowrange)>delta_range)
         lowrange=hirange-(HISUPPRESS-LOWSUPPRESS);

if((faultcount>lowrange)&&(faultcount<hirange))
         dirsuppress1=1;
      else{
         dirsuppress1=0;
         min_nst_init=0;
         max_nst_init=0;
      }
    } else dirsuppress1=0;

/* added 6/21/00 to allow additional suppression of
         direction assignment during cb status change not related
         to a shunt trip */
      if((cbstat_cnt>0)&&(cbstat_cnt<=NCBSTAT)){
            dirsuppress2=1;}
      else{
            dirsuppress2=0;}

}
 else{
    /* sysinfo[localmfm-1][CBSTCOL-1]=0; /*added 4/99 TLH */
    /* CBSTCOL should reflect the MFM1 action column when there is no fault
*/
    sysinfo[localmfm-1][CBSTCOL-1] = sysinfo[localmfm-1][MFM1COL-1];
    dirsuppress1=0;
      dirsuppress2=0;
```

APPENDIX A

```
    min_nst_init=0;
    max_nst_init=0;
       cbstat_cnt=0;
       cbstat_flag=0;

for(i=0;i<ACTIVEMFM3;i++){
        st_init[i]=0;
        nst_init[i]=0;
    }
  } /* end of if faultdetect equals 1*/ if(ct1){
    avepowflg1=1;
    Npowsum1=Npowsum1+1.0;
    powsum1=powsum1+power1;
    avepow1=powsum1/Npowsum1;
    imagsum1=imagsum1+imag1;
    aveimag1=imagsum1/Npowsum1;}
  else{
    avepowflg1=0;
    Npowsum1=0.0;
    powsum1=0.0;
    avepow1=0.0;
    imagsum1=0.0;
    aveimag1=0.0;
  } if((ct1) && avepowflg1){         /* optimizing code, TLH, 1/15/99 */
    if(aveimag1<LOWIPU)
      sysinfo[localmfm-1][LOW1ICOL-1]=1;
    if(aveimag1>HIGHIPU)
      sysinfo[localmfm-1][LOW1ICOL-1]=2;
    if((aveimag1<LOWCURRENT)||((aveimag1>LOWIPU)&&(aveimag1<HIGHIPU)))
      sysinfo[localmfm-1][LOW1ICOL-1]=3;
  }
  if(!avepowflg1)
      sysinfo[localmfm-1][LOW1ICOL-1]=0;
/* 6/00 -- eliminated ctdir suppression during reset to provide more
   direction assignments for high impedance faults */
   /* optimizing code, TLH, 1/15/99 */
 /* if((!ct1)||(ct1==4))   */
    if((!ct1))
        ctdir1=0;
    else{
      if(fabs(avepow1-sspwr1)>=fabs(sspwr1*POWMAG)){
        if(avepow1<LOWNEGPOW) ctdir1=-1;
        else if(avepow1>LOWPOSPOW) ctdir1=1;
          else
                ctdir1=0;
        }
      else
          ctdir1=0;

if(magn1<LOWVOLT)ctdir1=0;
        if(dirsuppress1||dirsuppress2)ctdir1=0;
    }
```

APPENDIX A

```
    if(ct2){
        avepowflg2=1;
            Npowsum2=Npowsum2+1.0;
        powsum2=powsum2+power2;
        avepow2=powsum2/Npowsum2;
        imagsum2=imagsum2+imag2;
        aveimag2=imagsum2/Npowsum2;}
    else{
        avepowflg2=0;
        Npowsum2=0.0;
        powsum2=0.0;
        avepow2=0.0;
        imagsum2=0.0;
        aveimag2=0.0;
    } if((ct2)&& avepowflg2){       /* optimizing code, TLH, 1/15/99 */
        if(aveimag2<LOWIPU)sysinfo[localmfm-1][LOW2ICOL-1]=1;
        if(aveimag2>HIGHIPU)sysinfo[localmfm-1][LOW2ICOL-1]=2;
        if(((aveimag2>LOWIPU)&&(aveimag2<HIGHIPU))
            ||(aveimag2<LOWCURRENT))sysinfo[localmfm-1][LOW2ICOL-1]=3;
    } if(avepowflg2!=1)
            sysinfo[localmfm-1][LOW2ICOL-1]=0;

/* 6/00 -- eliminated ctdir suppression during reset to provide more
    direction assignments for high impedance faults */
    /* optimizing code, TLH, 1/15/99 */
    /*    if((!ct2)||(ct2==4))  optimizing code, TLH, 1/15/99 */
        if(!ct2)
                ctdir2=0;
        else{
          if(fabs(avepow2-sspwr2)>=fabs(sspwr2*POWMAG)){
            if(avepow2<LOWNEGPOW)
                ctdir2=-1;
            else if(avepow2>LOWPOSPOW)
                ctdir2=1;
              else
                ctdir2=0;
        }
            else
            ctdir2=0;

if(magn2<LOWVOLT)ctdir2=0;
            if(dirsuppress1||dirsuppress2)ctdir2=0;
        } if(faultcount<NSAMPLE){
       ctdir1=0;
       ctdir2=0;
    }
}
```

APPENDIX A

```
        sysinfo[localmfm-1][CT1COL-1]=ctdir1;
        sysinfo[localmfm-1][CT2COL-1]=ctdir2;

/************* begin local buffer algorithm *********************/
/* generates 16 samples worth of local data when a fault        */
/* event begins.                                                */
/* this buffer is updated with every new sample (0.5ms)         */
/*                                                              */
        if(faultdetect){
           if(loc_buf_cnt>(LOC_BUF_SZ-1))
           loc_buf_cnt=0;
         local_mfm1[loc_buf_cnt][0]=faultcount;
           local_mfm1[loc_buf_cnt][1]=ctdir1;
           local_mfm1[loc_buf_cnt][2]=ctdir2;
           local_mfm2[loc_buf_cnt][0]=faultcount;
           local_mfm2[loc_buf_cnt][1]=sysinfo[localmfm-1][LOW1ICOL-1];
           local_mfm2[loc_buf_cnt][2]=sysinfo[localmfm-1][LOW2ICOL-1];
         loc_buf_cnt++;
        }
        else{
            loc_buf_cnt=0;
         if(faultreset){
           for (i=0;i<LOC_BUF_SZ;i++){
              for(j=0;j<3;j++){
                 local_mfm1[i][j]=0;
                    local_mfm2[i][j]=0;
                 }
              }
           }
        } /* end of faultdetect is true*/

} /* end of block for non-generator mfm3s */
}

/************* end of fault direction code ********************
;
; (4) Beginning of Topology algorithm --------------------------
; Description : Determines topology of the electrical system
;                specifically which generator sets are on-line
;                and whether running in a single ring or
;                double ring configuration.
;
; Input Variables:
;
; sysinfo[][], faultdetect, typemfm
;
; Local Variables:
;
; gen1sgcb :  status of 1sg generator circuit breaker
;             0==open, 1==closed
; gen2sgcb :  status of 2sg generator circuit breaker
;             0==open, 1==closed
; gen3sgcb :  status of 3sg generator circuit breaker
```

APPENDIX A

```
;              0==open, 1==closed
; cross_1s :   status of 1s cross tie circuit breakers
;              0== if both open, 1== if both closed
; cross_2s :   status of 2s cross tie circuit breakers
;              0== if both open, 1== if both closed
; cross_3s :   status of 3s cross tie circuit breakers
;              0== if both open, 1== if both closed
; longs    :   status of longitudinal circuit breakers
;              0== if both open, 1== if both closed
;
; Output variables:
;
; tglineup :   line-up of electrical system based on which
;              generators are on-line, assigned number of
;              1-7, depending on generator combination
; stdconfig :  configuration if in sngring or dblring where
;              sngring = flag for single ring configuration
;                  0== if not single ring, 1 == if single ring
;              dblring =  flag for double ring configuration
;                  0== if not double ring, 1 == if double ring
;
;
*/{ int gen1sgcb;
int gen2sgcb;
int gen3sgcb;
int cross_1S;
int cross_2S;
int cross_3S;
int longs;
int i;
int sngring;
int dblring;

for (i=0;i<DISTRMFM;i++){
          for (j=0;j<CLMNINFO;j++){
                  sysinfo_tmp[j][i]=sysinfo_in[i][j];
            }
          } for (i=0;i<DISTRMFM;i++){
            for (j=0;j<CLMNINFO;j++){
                    sysinfo[i][j]=sysinfo_tmp[i][j];
                }
          } faultdetect=sysinfo[localmfm-1][FLTCOL-1];
if(sysinfo[localmfm-1][TYPECOL-1]!=GENERATOR){
if(faultdetect==0){ for(i=0;i<DISTRMFM;i++){
      if((sysinfo[i][LOCCOL-1]==1)
        &&(sysinfo[i][TYPECOL-1]==GENERATOR))
           gen1sgcb=sysinfo[i][CBCOL-1];
      if((sysinfo[i][LOCCOL-1]==2)
        &&(sysinfo[i][TYPECOL-1]==GENERATOR))
```

APPENDIX A

```
        gen2sgcb=sysinfo[i][CBCOL-1];
    if((sysinfo[i][LOCCOL-1]==3)
     &&(sysinfo[i][TYPECOL-1]==GENERATOR))
        gen3sgcb=sysinfo[i][CBCOL-1];
}

/*DETERMINING GENERATOR LINEUP*/ if(gen1sgcb==0){
      if(gen2sgcb==0){
        if(gen3sgcb==0)
          tglineup = 0;
        if(gen3sgcb==1)
          tglineup = 1;
      }
      if(gen2sgcb==1){
        if(gen3sgcb ==0)
          tglineup = 2;
        if(gen3sgcb==1)
          tglineup = 3;
      }
    }
    if(gen1sgcb==1){
      if(gen2sgcb==0){
        if(gen3sgcb==0)
          tglineup = 4;
        if(gen3sgcb==1)
          tglineup = 5;
      }
      if(gen2sgcb==1){
        if(gen3sgcb==0)
          tglineup = 6;
        if(gen3sgcb==1)
          tglineup = 7;
      }
    }

/*DETERMINING SYSTEM TOPOLOGY */
    if((gen1sgcb==1)&&(gen2sgcb==1)&&(gen3sgcb==1)){
      if((sysinfo[4][CBCOL-1]==0)&&(sysinfo[5][CBCOL-1]==0)){
            tglineup=5;
            tg1g3g=1;
      }
      if((sysinfo[0][CBCOL-1]==0)&&(sysinfo[1][CBCOL-1]==0)){
            tglineup=3;
            tg2g3g=1;
      }
      if((sysinfo[6][CBCOL-1]==0)&&
            (sysinfo[8][CBCOL-1]==0)){
            tglineup=6;
            tg1g2g=1;
      }
    } if((sysinfo[0][CBCOL-1]==1)&&(sysinfo[1][CBCOL-1]==1))
         cross_1S=1;
       else
```

APPENDIX A

```
        cross_1S=0;

if((sysinfo[4][CBCOL-1]==1)&&(sysinfo[5][CBCOL-1]==1))
        cross_2S =1;
    else
        cross_2S =0;

if((sysinfo[6][CBCOL-1]==1)&&(sysinfo[7][CBCOL-1]==1))
        cross_3S =1;
    else
        cross_3S =0;

if((sysinfo[2][CBCOL-1]==1)&&(sysinfo[3][CBCOL-1]==1))
        longs =1;
    else
        longs =0;

if((cross_1S)&&(cross_2S)&&(cross_3S)&&(longs))
        dblring =1;
    else
        dblring =0;

if((cross_1S)&&(!cross_2S)&&(cross_3S)&&
       ((tglineup==5)||(tglineup==7)))
        sngring=1;
    else if((cross_1S)&&(cross_2S)&&(!cross_3S)&&
       ((tglineup==6)||(tglineup==7)))
          sngring=1;
    else if((!cross_1S)&&(cross_2S)&&(cross_3S)&&
       ((tglineup==3)||(tglineup==7)))
          sngring=1;
    else
        sngring=0;

if(sngring||dblring)
            stdconfig=1;
        else
            stdconfig=0;

} /* end of if faultdetect = 0 */
} /* end of if local mfm is not generator mfm */
} /* end of gensets.c */
}/* end of Topology algorithm ------------------------
;
;
; (5) Beginning of switchboard fault algorithm ------------
;
; Description : Determines if switchboard fault exists
;               based on local ct status and thirdct status
;               if applicable
;
; Input Variables:
;
;  sysinfo[][], thirdct, ctdir, ctdir2, ig1,
;  localct1, localct2, thirdct, fullinfo3,
```

APPENDIX A

```
;   sngring, dblring, tglineup, localmfm, typemfm
;
; Local Variables:
;
; sumswbdflts : sum of all system switchboard faults
; summfmlacts : sum of all prior mfml actions to split plant
;
;
;  Output variables:
;
; swbdflag     : flag to allow execution of a block of
;                code to determine if local switchboard
;                fault exists
;                0== no swbd fault, 1== swbd fault
; swbdflt      : flag to update sysinfo matrix that a
;                local swbdflt has been detected
; Nswbd        : counter that must exceed
;                Nswbdsample for swbdflag and swbdflt ==1
; swbdcount    : flag to indicate local swbd flt counter is active
;                0== inactive, 1== active
; Nswbdmax     : max number of samples when swbdflt == 1
;   stswbd     : flag to indicate a shunt trip flag is set for
;                a switchboard fault,
;                0 == no shunt trip for swbd flt,
;                1 == shunt trip for swbd flt
; Nswbdcomm:. counter while checking for other swbd faults
;               in the electrical system
; Ncommdelay: flag to begin count of Nswbdcomm
;                0 == no count, 1 == count in progress
;
; nstswbdflag : counter while stswbd == 1
; nstswbdmax  : max counter while stswbd == 1
*/{
int k;
int sumswbdflts;
int summfmlacts;

if(sysinfo[localmfm-1][TYPECOL-1]!=GENERATOR){

/* for local fault detection:
 no need to wait for outside information to determine
 if swbd fault exists, local switchboard faults are independently
 determined only for outside corner mfms at the 1S and 3S swbds.
   Also, no need to execute the local swbd fault detection if
 no fault is detected locally.
*/
if(!swbdflag&&sysinfo[localmfm-1][FLTCOL-1]){ if(sysinfo[localmfm-1][TYPECOL-1]==CORNER){ if(((ctdir1==1)||(!ig1))&&(ctdir2==-1)){
          if(!swbdcount){
             Nswbd=0;
             swbdcount=1;
                 swbdflt=0;
          }
             Nswbd+=1;
```

APPENDIX A

```
      if(Nswbd>Nswbdmax)
        Nswbdmax=Nswbd;
      if((Nswbd>=NSWBDSAMPLE)&&(!swbdflag)){
        swbdflt=1;
        swbdflag=1;
      }
           else{
               swbdflt=0;
               swbdflag=0;
           }
      }
      else{
         Nswbd=0;
         swbdcount=0;
               swbdflt=0;
      }
    }
    else if(sysinfo[localmfm-1][TYPECOL-1]==INSIDECORNER){

/* Have to get data samples at same fault counters.. note that
changed ctdir1 to localct1, ctdir2 to localct2 since these
variables need to come from the fltcounter algorithm where
data matching
occurs.  The term fullinfo3 indicates that a full set of data
has been found
for the same fault counter and can be used to determine if swbd
fault exists.
*/ if(fullinfo3){
          if(((localct1==1)||(!sysinfo[localmfm-1][CBCOL-1]))
            &&(localct2==-1)&&(thirdct==-1)){
                if(!swbdcount){
                   Nswbd=0;
                            swbdflt=0;
                   swbdcount=1;
                }
                Nswbd+=1;
                if(Nswbd>Nswbdmax)
                  Nswbdmax=Nswbd;
                if((Nswbd>=NSWBDSAMPLE)&&(!swbdflag)){
                  swbdflt=1;
                  swbdflag=1;
                }
                       else{
                              swbdflt=0;
                              swbdflag=0;
                       }
          }
           else if(fullinfo2&&(remotecb2==0)&&(localimag2==1)
               &&((localct1==1)||(!sysinfo[localmfm-1][CBCOL-1]))
               &&(thirdct==-1)){
                if(!swbdcount){
                   Nswbd=0;
                            swbdflt=0;
                   swbdcount=1;
                }
```

APPENDIX A

```
            Nswbd+=1;
            if(Nswbd>Nswbdmax)
              Nswbdmax=Nswbd;
            if((Nswbd>=NSWBDSAMPLE)&&(!swbdflag)){
              swbdflt=1;
              swbdflag=1;
            }
                    else{
                            swbdflt=0;
                            swbdflag=0;
                    }
      }
        else {
             swbdflt=0;
            swbdflag=0;
           Nswbd=0;
        }

/* fullinfo3=0;*/ /* deleted 6/21/00 */
     }
    else{
      Nswbd=0;
      swbdcount=0;
          swbdflt=0;
    }
  } sysinfo[localmfm-1][SWBDCOL-1]=swbdflt;

} /* end of if swbdflt and faultdetect not true */ if(sysinfo[localmfm-1][TYPECOL-1]==STRAIGHT){
         Nswbd=0;
       swbdcount=0;
           swbdflt=0;
           sysinfo[localmfm-1][SWBDCOL-1]=swbdflt;
    }

/* this is a check to see if other swbd faults exist elsewhere
 in the electrical
 system.  There is a pre-set time delay, driven by the sample
 times every 0.5ms
 A communication delay time of at least 8ms (16 samples) should
 be used to
 show worst case delays based on three collisions between each of
 the five
 pt-to-pt mfm transfers.
*/ sumswbdflts=0;
    for (k=0;k<DISTRMFM;k++)
       sumswbdflts=sysinfo[k][SWBDCOL-1]+sumswbdflts;

sum_mfm1_action=0;
    for (k=0;k<DISTRMFM;k++)
```

APPENDIX A

```
        sum_mfm1_action=sysinfo[k][MFM1COL-1]+sum_mfm1_action;

if((sumswbdflts==1)&&(sum_mfm1_action<1)){
       if(!Ncommdelay){
          Nswbdcomm=0;
          Ncommdelay=1;
       }

Nswbdcomm++;

/* once the commdelay is exceeded and no other
   reports of swbd faults or mfm1 action
   are recorded (only one swbd fault in the
   electrical system) then
   action can be taken depending on which
   generators are on-line/topology of the system and
   which swbd the fault is located. This routine is skipped
   if the adjacent circuit breaker is already open or the plant is
   not in a standard topology.
*/ if((Nswbdcomm>=NCOMMSAMPLE)&&(!stswbd)&&(stdconfig)
                &&sysinfo[localmfm-1][CBCOL-1]){ switch(localmfm){
/*         if mfm is located at the 1SB SWBD (1)*/
           case 1:{
             if(sysinfo[localmfm-1][SWBDCOL-1]){
               if((tglineup==1)||(tglineup==2)||(tglineup==4)){
                    stswbd=1;
                    stacbflag=1;
                    swbdcount=0;
                        goto 1999;
               }
             }
             if((sysinfo[1][SWBDCOL-1])||(sysinfo[4][SWBDCOL-1])){
                if((tglineup!=1)&&(tglineup!=2)&&(tglineup!=4)){
                    stswbd=1;
                    stacbflag=1;
                    swbdcount=0;
                        goto 1999;
                }
             }
                   break;
           }

/*         if mfm is located at the 1SA SWBD (2)   */
           case 2:{
             if(sysinfo[localmfm-1][SWBDCOL-1]){
               if((tglineup==1)||(tglineup==2)||(tglineup==4)){
                    stswbd=1;
                    stacbflag=1;
                    swbdcount=0;
                        goto 1999;
               }
```

APPENDIX A

```
            }
            if((sysinfo[0][SWBDCOL-1])||(sysinfo[5][SWBDCOL-1])){
                if((tglineup!=1)&&(tglineup!=2)&&(tglineup!=4)){
                    stswbd=1;
                    stacbflag=1;
                    swbdcount=0;
                            goto 1999;
                }
            }
            break;
        }

/*          if mfm is located at the 3SB SWBD (7)    */
        case 7:{
            if(sysinfo[localmfm-1][SWBDCOL-1]){
              if((tglineup==1)||(tglineup==2)||(tglineup==4)){
                    stswbd=1;
                    stacbflag=1;
                    swbdcount=0;
                            goto 1999;
                }
            }
            if(sysinfo[7][SWBDCOL-1]){
                if((tglineup!=1)&&(tglineup!=2)&&(tglineup!=4)){
                    stswbd=1;
                    stacbflag=1;
                    swbdcount=0;
                            goto 1999;
                }
            }
            if(sysinfo[0][SWBDCOL-1]){
                if(tglineup==3){
                    stswbd=1;
                    stacbflag=1;
                    swbdcount=0;
                            goto 1999;
                }
            }
            if(sysinfo[4][SWBDCOL-1]){
                if(tglineup!=5){
                    stswbd=1;
                    stacbflag=1;
                    swbdcount=0;
                            goto 1999;
                }
            }
            if(sysinfo[5][SWBDCOL-1]){
                if(tglineup==5){
                    stswbd=1;
                    stacbflag=1;
                    swbdcount=0;
                            goto 1999;
                    }
                }
                break;
```

APPENDIX A

```
            }
/*      if mfm is located at the 3SA SWBD (8)   */
        case 8:{
          if(sysinfo[localmfm-1][SWBDCOL-1]){
            if((tglineup==1)||(tglineup==2)||(tglineup==4)){
                stswbd=1;
                stacbflag=1;
                swbdcount=0;
                        goto 1999;
            }
          }
          if(sysinfo[6][SWBDCOL-1]){
            if((tglineup!=1)&&(tglineup!=2)&&(tglineup!=4)){
                stswbd=1;
                stacbflag=1;
                swbdcount=0;
                        goto 1999;
            }
          }
          if(sysinfo[1][SWBDCOL-1]){
            if(tglineup==3){
                stswbd=1;
                stacbflag=1;
                swbdcount=0;
                        goto 1999;
            }
          }
          if(sysinfo[5][SWBDCOL-1]){
            if(tglineup!=5){
                stswbd=1;
                stacbflag=1;
                swbdcount=0;
                        goto 1999;
            }
          }
          if(sysinfo[4][SWBDCOL-1]){
            if(tglineup==5){
                stswbd=1;
                stacbflag=1;
                swbdcount=0;
                        goto 1999;
            }
          }
                break;
        }

/*      if mfm is located at the 2SA SWBD corner (6)*/
        case 6:{
          if(sysinfo[localmfm-1][SWBDCOL-1]){
            if((tglineup==1)||(tglineup==2)||(tglineup==4)){
                stswbd=1;
                stacbflag=1;
                swbdcount=0;
                        goto 1999;
            }
          }
```

APPENDIX A

```
            if(sysinfo[4][SWBDCOL-1]){
               if((tglineup!=1)&&(tglineup!=2)&&(tglineup!=4)){
                   stswbd=1;
                   stacbflag=1;
                   swbdcount=0;
                          goto 1999;
               }
            }
            if(sysinfo[0][SWBDCOL-1]){
               if(tglineup==3){
                   stswbd=1;
                   stacbflag=1;
                   swbdcount=0;
                          goto 1999;
               }
            }
            if(sysinfo[6][SWBDCOL-1]){
               if(tglineup==6){
                   stswbd=1;
                   stacbflag=1;
                   swbdcount=0;
                          goto 1999;
               }
            }
            if(sysinfo[7][SWBDCOL-1]){
               if(tglineup!=6){
                   stswbd=1;
                   stacbflag=1;
                   swbdcount=0;
                          goto 1999;
               }
            }
               break;
         }
/*       if mfm is located at the 2SB corner SWBD (5)   */
         case 5:{
           if(sysinfo[localmfm-1][SWBDCOL-1]){
             if((tglineup==1)||(tglineup==2)||(tglineup==4)){
                   stswbd=1;
                   stacbflag=1;
                   swbdcount=0;
                       goto 1999;
             }
           }
           if(sysinfo[5][SWBDCOL-1]){
              if((tglineup!=1)&&(tglineup!=2)&&(tglineup!=4)){
                   stswbd=1;
                   stacbflag=1;
                   swbdcount=0;
                          goto 1999;
              }
           }
           if(sysinfo[1][SWBDCOL-1]){
              if(tglineup==3){
                   stswbd=1;
                   stacbflag=1;
```

APPENDIX A

```
            swbdcount=0;
                    goto 1999;
            }
        }
        if(sysinfo[7][SWBDCOL-1]){
           if(tglineup==6){
               stswbd=1;
               stacbflag=1;
               swbdcount=0;
                    goto 1999;
           }
        }
        if(sysinfo[6][SWBDCOL-1]){
           if(tglineup!=6){
               stswbd=1;
               stacbflag=1;
               swbdcount=0;
                    goto 1999;
           }
        }
           break;
      }
/*    if mfm is located at the 2SB straight SWBD (3)   */
      case 3:{
        if(sysinfo[4][SWBDCOL-1]){
          if((tglineup==1)||(tglineup==2)||(tglineup==4)){
               stswbd=1;
               stacbflag=1;
               swbdcount=0;
                    goto 1999;
          }
        }
        if(sysinfo[0][SWBDCOL-1]){
           if(tglineup!=3){
               stswbd=1;
               stacbflag=1;
               swbdcount=0;
                    goto 1999;
           }
        }
        if(sysinfo[6][SWBDCOL-1]){
               stswbd=1;
               stacbflag=1;
               swbdcount=0;
                    goto 1999;
        }
            break;
      } /* end of case 3 */

/*    if mfm is located at the 2SA straight SWBD (4)   */
      case 4:{
        if(sysinfo[5][SWBDCOL-1]){
          if((tglineup==1)||(tglineup==2)||(tglineup==4)){
               stswbd=1;
               stacbflag=1;
               swbdcount=0;
```

APPENDIX A

```
                    goto 1999;
                }
            }
            if(sysinfo[1][SWBDCOL-1]){
                if(tglineup!=3){
                    stswbd=1;
                    stacbflag=1;
                    swbdcount=0;
                        goto 1999;
                }
            }
            if(sysinfo[7][SWBDCOL-1]){
                    stswbd=1;
                    stacbflag=1;
                    swbdcount=0;
                        goto 1999;
            }

} /* end of case 4*/

} /* end of switch*/

} /* end of if (nswbdcomm>=NCOMMSAMPLE)&&(!stswbd) */

} /* end of if(sumswbdflts=1 and no action by mfm1 and stnd plant*/ else{
       Ncommdelay=0;
    /*     stswbd=0;   */
       }

1999: if(stswbd){
           nstswbdflag++;
            if(nstswbdflag>nstswbdmax)
               nstswbdmax=nstswbdflag;
     }
     else
         nstswbdflag=0;

} /*end of if block for non-generator mfm3s*/
}
}/* end of switchboard fault code --------------------
;
;
;
; (6) Beginning of bustie fault algorithm ------------
;
; Description : Determines if bustie fault exists
;               based on local ct and remote data
;
;  Input Variables:
;
;  localct1,localct2,remotect1,remotect2,remotecb1,remotecb2
;  fltdetect1, fltdetect2, swbdflt
;  fullinfo1, fullinfo2 as previously defined
```

APPENDIX A

```
;
;   dirct1 :  proper direction of fault current thru ct1
;             for bustie fault event,
;             initialized as 1 or -1 depending on location
;             of mfm3
;
;   dirct2 :  proper direction of fault current thru ct2
;             for bustie fault event,
;             initialized as 1 or -1 depending on location
;             of mfm3
;
; Output variables:
;
; stct1count: flag for bus tie fault counter to proceed for ct1
;             == 0 for no bus tie fault
;             == 1 when bus tie fault exists until
;                 ncbsample or nctsample counters exceeded
; stct2count: flag for bus tie fault counter to proceed for ct2
;             == 0 for no bus tie fault
;             == 1 when bus tie fault exists until
;                 ncbsample or nctsample counters exceeded
;
; nct1_ct  : bustie fault counter based on ct1 and remote ct
; nct2_ct  : bustie fault counter based on ct2 and remote ct
; nct1_cb  : bustie fault counter based on ct1 and remote cb
; nct2_cb  : bustie fault counter based on ct2 and remote cb
;
; stct1flag: flag for bus tie fault exists thru ct1
;            == 0 for no bus tie fault
;            == 1 when bus tie fault exists and
;                ncbsample or nctsample counters exceeded
; stct2flag: flag for bus tie fault exists thru ct2
;            == 0 for no bus tie fault
;            == 1 when bus tie fault exists and
;                ncbsample or nctsample counters exceeded;
;
; check for bus-tie faults only when a full set of
; information becomes available from datamatching routine
; and if the local ct has established current direction
; (fltdetect == 1)
; Don't bother executing if a local switchboard fault
; is currently detected.
*/{ int ct1ctcount,ct1cbcount,ct1imcount;
int ct2ctcount,ct2cbcount,ct2imcount;

ct1ctcount=0;
ct1cbcount=0;
ct1imcount=0;
ct2ctcount=0;
ct2cbcount=0;
ct2imcount=0;

if(sysinfo[localmfm-1][TYPECOL-1]!=GENERATOR){
if(!swbdflt){
 if((fullinfo1)&&(fltdetect1)){
```

APPENDIX A

```
if(localct1==dirct1){ if((remotect1==dirct1)&&(!stct1_dir)){
           ct1ctcount=1;
           if(!stct1count){
             nct1_ct=0;
             stct1count=1;
           }
           nct1_ct+=1;
                if(nct1_ct>nct1_ct_max)nct1_ct_max=nct1_ct;
           if(nct1_ct>=NBTSAMPLE){
             nct1_ct=0;
             stct1count=0;
             stct1_dir=1;
           }
        }
        else{
          nct1_ct=0;
             ct1ctcount=0;
             } if( ((!remotecb1)&&(!stct1_dir)&&(remotect1!=(0-dirct1)))   ){
           ct1cbcount=1;
                if(!stct1count){
           nct1_cb=0;
           stct1count=1;
           }
           nct1_cb+=1;
                if(nct1_cb>nct1_cb_max)nct1_cb_max=nct1_cb;
           if(nct1_cb>=NCBSAMPLE){
             nct1_cb=0;
             stct1count=0;
             stct1_dir=1;
           }
        }
        else{
          nct1_cb=0;
             ct1cbcount=0;
             }
   }/* end of if(localct=dirct1) */ if((sysinfo[localmfm-1][TYPECOL-1]==STRAIGHT)&&
        ((localimag1==2&&rmtimag1==1)||
          (localimag1==1&&rmtimag1==2))&&(!stct1_mag)){
           ct1imcount=1;
           if(!stct1count){
           nct1_im=0;
           stct1count=1;
   }
        nct1_im+=1;
                if(nct1_im>nct1_im_max)nct1_im_max=nct1_im;
        if(nct1_im>=NBTSAMPLE){
           nct1_im=0;
           stct1count=0;
           stct1_mag=1;
        }
 }
```

APPENDIX A

```
    else{
      nct1_im=0;
        ctlimcount=0;
      } if(!ct1ctcount&&!ct1cbcount&&!ctlimcount&&!stct1_dir&&!stct1_mag){
       nct1_cb=0;
         nct1_ct=0;
         nct1_im=0;
      stct1count=0;
  }

/* fullinfo1=0; */  /* deleted 6/21/00 */
}
if((fullinfo2)&&(fltdetect2)){ if(localct2==dirct2){
           if((remotect2==dirct2)&&(!stct2_dir)){
                      ct2ctcount=1;
             if(!stct2count){
               nct2_ct=0;
               stct2count=1;
             }
             nct2_ct+=1;
                     if(nct2_ct>nct2_ct_max)nct2_ct_max=nct2_ct;
             if(nct2_ct>=NBTSAMPLE){
               nct2_ct=0;
               stct2count=0;
               stct2_dir=1;
             }
           }
           else{
             nct2_ct=0;
                 ct2ctcount=0;
                 }
           if( ((!remotecb2)&&(!stct2_dir)&&(remotect2!=(0-dirct2)))&&
                     (rmtimag2!=localimag2) ){
             ct2cbcount=1;
                     if(!stct2count){
               nct2_cb=0;
               stct2count=1;
             }
             nct2_cb+=1;
                     if(nct2_cb>nct2_cb_max)nct2_cb_max=nct2_cb;
             if(nct2_cb>=NCBSAMPLE){
               nct2_cb=0;
               stct2count=0;
               stct2_dir=1;
             }
           }
           else{
             nct2_cb=0;
                 ct2cbcount=0;
                 }
    }/* end of if(localct2=dirct1) */
```

APPENDIX A

```
    if(((localimag2==2&&rmtimag2==1)||
           (localimag2==1&&rmtimag2==2))&&(!stct2_mag)){
        ct2imcount=1;
        if(!stct2count){
        nct2_im=0;
        stct2count=1;
        }
      nct2_im+=1;
            if(nct2_im>nct2_im_max)nct2_im_max=nct2_im;
        if(nct2_im>=NBTSAMPLE){
        nct2_im=0;
        stct2count=0;
        stct2_mag=1;
        }
    }
    else{
        nct2_im=0;
          ct2imcount=0;
        } if(!ct2ctcount&&!ct2cbcount&&!ct2imcount&&!stct2_dir&&!stct2_mag){
        nct2_cb=0;
          nct2_ct=0;
            nct2_im=0;
        stct2count=0;
    }

/* fullinfo2=0; */ /* deleted 6/21/00 */
 }
} if(stct1_dir||stct2_dir||stct1_mag||stct2_mag)
   btflt=1;
else
   btflt=0;

} /* end of block for non-generator mfm3s */
}
/* end of bustie fault code -------------------------
; (7) Beginning of shunt trip code --------------------
;
;
; Description : Performs one more check for a bustie fault using
;                only local data and sets a shunt trip flag
;                for the local acb for either a bustie or
;                switchboard fault
;
;  Input Variables:
;     sysinfo, localmfm, stct1flag, stct2flag, stswbd
;     faultcount, rem_fltcnt[], match_fltcnt, close_acb
;     as previously defined
;
;  Local Variables:
;
;
```

APPENDIX A

```
;   mfm1_st: flag to indicate if ACB was already shunt tripped
;            by MFM1 algorithm, 0== not tripped, 1 == tripped
;
;
;   Output variables:
;
;   set_stinit : flag to indicate if ACB is about to be or was
;                already shunt tripped, for update of sysinfo
;                matrix, 0== not tripped, 1 == tripped
;   btfltct1: flag to indicate a bustie flt from ct1,
;             remains at 1 until circuit breaker is reset
;   btfltct2: flag to indicate a bustie flt from ct2,
;             remains at 1 until circuit breaker is reset
;
;   stct1: flag that bustie flt seen by ct1,
;             remains at 1 until circuit breaker is reset
;             remains at 1 until circuit breaker is reset
;   stct2: flag that bustie flt seen by ct2,
;             remains at 1 until circuit breaker is reset
;             remains at 1 until circuit breaker is reset
;   stacb :  flag to shunt trip the local ACB circuit breaker
;             0 == no shunt trip
;             1 == shunt trip
;
;   Execute Shunt trip section only if shunt trip signal hasn't
;      already been sent................
*/
{
int mfm1_st;

if(sysinfo[localmfm-1][TYPECOL-1]!=GENERATOR){ shunt_trip=0;
mfm1_st=sysinfo[localmfm-1][MFM1COL-1];

if((stct1_dir)&&(!stct1)){
           if(faultcount>rem_flt_cnt[0]){
              if(ctdir1==dirct1){
                 btfltct1=1;
                 stct1=1;
              }
              else{
                 btfltct1=0;
                 stct1=0;
                 stct1_dir=0;
              }
           }
           else{
             btfltct1=0;
             stct1=0;
           }
        } if((stct1_mag)&&(!stct1)){
        if(faultcount>rem_flt_cnt[0]){
           if(localimag1==sysinfo[localmfm-1][LOW1ICOL-1]){
              btfltct1=1;
```

APPENDIX A

```
      stct1=1;
    }
    else{
       btfltct1=0;
       stct1=0;
       stct1_mag=0;
    }
  }
  else{
    btfltct1=0;
    stct1=0;
  }
} if((localmfm==7)||(localmfm==8)){
 if((stct2_dir)&&(!stct2)){
  if(faultcount>match_fltcnt){
     if(ctdir2==dirct2){
       btfltct2=1;
       stct2=1;
     }
     else{
       btfltct2=0;
       stct2=0;
       stct2_dir=0;
     }
  }
  else{
    btfltct2=0;
    stct2=0;
  }
 } if((stct2_mag)&&(!stct2)){
  if(faultcount>match_fltcnt){
     if(localimag2==sysinfo[localmfm-1][LOW2ICOL-1]){
       btfltct2=1;
       stct2=1;
     }
     else{
       btfltct2=0;
       stct2=0;
       stct2_mag=0;
     }
  }
  else{
    btfltct2=0;
    stct2=0;
  }
 }

}
else{ if((stct2_dir)&&(!stct2)){
  if(faultcount>rem_flt_cnt[1]){
```

APPENDIX A

```
        if(ctdir2==dirct2){
            btfltct2=1;
            stct2=1;
        }
        else{
            btfltct2=0;
            stct2=0;
            stct2_dir=0;

}
    }
    else{
      btfltct2=0;
      stct2=0;
    }
 } if((stct2_mag)&&(!stct2)){
  if(faultcount>rem_flt_cnt[1]){
    if(localimag2==sysinfo[localmfm-1][LOW2ICOL-1]){
      btfltct2=1;
      stct2=1;
    }
    else{
      btfltct2=0;
      stct2=0;
      stct2_mag=0;
    }
  }
  else{
    btfltct2=0;
    stct2=0;
  }
 }

} /* end of looking for shunt trip flags stct1 or stct2 */

/* dont execute this section if the adjacent circuit breaker is already open*/
    if(!set_stinit&&ig1)
    {
        if(sysinfo[localmfm-1][TYPECOL-1]!=2)
            {
            if(stct1||stct2||stswbd||mfm1_st)
                {
                set_stinit=1;
                sysinfo[localmfm-1][CBSTCOL-1]=1;
            }
            else
                sysinfo[localmfm-1][CBSTCOL-1]=0;
        }
        else
            {
            if(stct1||stct2||stswbd)
                {
                set_stinit=1;
                sysinfo[localmfm-1][CBSTCOL-1]=1;
```

APPENDIX A

```
            }
         else
            sysinfo[localmfm-1][CBSTCOL-1]=0;
        }
      } if(!stacb){
        if(stct1){
          if(!ig1)
             stct1=0;
        }
         if(stct2){
          if(!ig1)
             stct2=0;
        } if(stct1||stct2||stswbd){
            stacb =1;
                shunt_trip=1;
        }

} /* end of shunt trip section*/ if(close_acb){
            stacb=0;
            stct1=0;
            stct2=0;
            stswbd=0;
            set_stinit=0;
            stct1_mag=0;
            stct2_mag=0;
               stct1_dir=0;
            stct2_dir=0;
            btfltct1=0;
            btfltct2=0;
         }

} /*end of block for non-generator mfm3s*/
 }/* end of shunt trip algorithm ---------------------*/ return(stacb);

} /* end of IPCSMFM3 */
```

APPENDIX B

```
/*                                                             APPENDIX B
; FILE:          mfm3dtup.c
; DESCRIPTION:   System Information Updating Algorithm
;
; Date: June 2000
; Rev J (previous Rev H)
;
;    Naval Surface Warfare Center
;    Acoustic Trials Detachment
;    Attn: Tracy Hannon
;    740 Mullet Road
;    Cape Canaveral, FL 32940
;    (407-784-3645)
;
; -----------------------------------------------------------------
;        Data Updating Code
;
;        This code is executed every 1ms prior to execution of IPCS/MFM1.
;
;
;        This code requires as input the rem_update matrix,
;        the modified rem_sysinfo matrix, and the local system matrix.
/*
; -----------------------------------------------------------------
; If remote row information is received directly from the MFM that
; generated the data, update only the row corresponding
; to the location from where the incoming matrix was sent.
; This loop is crucial to determine topology of the system
; during non-fault conditions.
;
; Warning: Determining topology at startup is dependent on
; ring ethernet functioning properly.
; -----------------------------------------------------------------
; If an incoming matrix contains a row indicating fault detection and
; a new fault counter that exceeds the previously stored fault counter
; for that row, and the previously stored row shows that a fault condition
; was not reset,
; that row will be updated in the local system matrix.
; -----------------------------------------------------------------
; If an incoming matrix contains a row indicating a fault reset
; occurred and a zero fault counter for that row,
; and the previously stored data for that row shows a fault condition,
; update that row and lock out further updates for this data window.
; -----------------------------------------------------------------
; If an incoming matrix contains a row showing a zero fault reset
; and a zero fault counter for that row, and previously stored data
; for that row indicates a fault reset occurred and a zero fault counter
; for that row, update that row and lock out further
; updates for this data window.
;
; -----------------------------------------------------------------
;        Input Variables:
;
;        rem_update[n]  : flag to indicate that a new data matrix
;                         was received and stored,
;                         "0" for no new matrix received from MFM #(n+1),
;                         "1" for new matrix received from MFM #(n+1)
```

APPENDIX B

```
;
;
;       sysinfo[][]     : locally stored system information matrix
;                         that is updated with remotely received
;                         system information and locally determined fault
;                         status, circuit breaker status, etc...
;
;  rem_sysinfo[][][]    : remote system information matrix
;                         developed from remote information matrices
;                         through ethernet connections, storing information
;                                   obtained in the last 1ms window
;
;
;
; ------------------------------------------------------------------
;       Outputs Variables:
;
;
;        updaterow[]    : matrix used to store a flag indicating if a
;                         a given row has been updated with new remotely
;                         received data, "0" for no updates, "1" for update,
;                         used in the datamatching algorithm.
;
; ------------------------------------------------------------------
*/
include "ipcs.h"
void DATAUPDATE(void){ int k;
int p,q;
int l,m,n;
int mfmnum;
int directrow[DISTRMFM]={0,0,0,0,0,0,0,0,0,0,0,0};

/* added code to prioritize direct updates of rows first
   9/10/99 by TLH */ if(sysinfo[localmfm-1][TYPECOL-1]!=GENERATOR){

/*
; ------------------------------------------------------------------
; When a fault is not detected and a fault event isn't being reset,
; update only the row corresponding to the location from
; where the incoming matrix was sent.
; This loop is used to determine topology of the system
; during pre-fault conditions.
;
; Warning: Determining topology is dependent on
; ring ethernet functioning properly.
; ------------------------------------------------------------------
;    If an incoming matrix contains a row indicating fault detection and
;  a new fault counter that exceeds the previously stored fault counter
;  for that row, and a fault is detected locally (fault reset is zero)
;  that row will be updated in the local system matrix.
;
;    If an incoming matrix contains a row indicating a fault reset is
;  occurring and a zero fault counter for that row,
```

APPENDIX B

```
;   and a fault is no longer detected locally (fault reset is one)
;   that row will be updated in the local system matrix.
;
;   ----------------------------------------------------------------
*/

/* if obtain remote row info directly from remote MFM,
update that remote row only and set direct row flag to prevent
an overwrite of that row */
for(mfmnum=0;mfmnum<DISTRMFM;mfmnum++){
   if(rem_update[mfmnum]){
            for(l=0;l<CLMNINFO;l++)
              sysinfo[mfmnum][l]=rem_sysinfo[mfmnum][mfmnum][l];

updaterow[mfmnum]=1;
            directrow[mfmnum]=1;
   }
}

/* check remaining rows of the imported matrices */
for(mfmnum=0;mfmnum<DISTRMFM;mfmnum++){
   if(rem_update[mfmnum]){ if(mfmnum<(DISTRMFM-NUMGENSET)){ /*prevents updates of remote rows of
                                            distribution MFMs from info
                                            received
                                            from generator MFMs */ for(k=0;k<(localmfm-1);k++){
                  if(!directrow[k]){
          /* if the new remote row has fltcount greater than stored remote row
             fault counter and previously stored flt reset was not a 1 */
                  if((rem_sysinfo[mfmnum][k][FLTCNT-1]>sysinfo[k][FLTCNT-1])
                  &&(!sysinfo[k][FLTRST-1])){ for(l=0;l<CLMNINFO;l++)
                          sysinfo[k][l]=rem_sysinfo[mfmnum][k][l];

updaterow[k]=1;
              }
          /* if the new remote row has fltcount=0 and fltreset=1,
             and previously stored fault detected, update that row*/
                  if((!rem_sysinfo[mfmnum][k][FLTCNT-1])
                  &&(rem_sysinfo[mfmnum][k][FLTRST-1])
                      &&(sysinfo[k][FLTCOL-1])){ for(m=0;m<CLMNINFO;m++)
                          sysinfo[k][m]=rem_sysinfo[mfmnum][k][m];

updaterow[k]=1;
                      directrow[k]=1;

}
          /* if the stored remote row has fltcount=0 and fltreset=1 but the
             new remote row has fltcount=0 and faultreset=0, update that row*/ if((!sysinfo[k][FLTCNT-1])&&(sysinfo[k][FLTRST-1])&&
```

APPENDIX B

```
              (!rem_sysinfo[mfmnum][k][FLTCNT-1])&&
              (!rem_sysinfo[mfmnum][k][FLTRST-1])){
                  for(m=0;m<CLMNINFO;m++)
                  sysinfo[k][m]=rem_sysinfo[mfmnum][k][m];
              updaterow[k]=1;
                  directrow[k]=1;

}

}  /*end of if directrow .ne. 1 */
  } /* end of loop for k */ for(n=localmfm;n<ACTIVEMFM3;n++){ if(!directrow[n]){

/* if the new remote row has fltcount greater than stored remote row
fault counter and previously stored flt reset was not a 1 */
       if((rem_sysinfo[mfmnum][n][FLTCNT-1]>sysinfo[n][FLTCNT-1])
          &&(!sysinfo[n][FLTRST-1])){ for(p=0;p<CLMNINFO;p++)
                  sysinfo[n][p]=rem_sysinfo[mfmnum][n][p];

updaterow[n]=1;

}
  /* if the new remote row has fltcount=0 and fltreset=1,
     and previously stored fault detected, update that row*/
              if((!rem_sysinfo[mfmnum][n][FLTCNT-1])
                  &&(rem_sysinfo[mfmnum][n][FLTRST-1])
                  &&(sysinfo[n][FLTCOL-1])){ for(q=0;q<CLMNINFO;q++)
                      sysinfo[n][q]=rem_sysinfo[mfmnum][n][q];

updaterow[n]=1;
                  directrow[n]=1;

}

/* if the stored remote row has fltcount=0 and fltreset=1 but the
     new remote row has fltcount=0 and faultreset=0,update that row*/ if((!sysinfo[n][FLTCNT-1])&&(sysinfo[n][FLTRST-1])&&
              (!rem_sysinfo[mfmnum][n][FLTCNT-1])&&
              (!rem_sysinfo[mfmnum][n][FLTRST-1])){
                  for(q=0;q<CLMNINFO;q++)
                      sysinfo[n][q]=rem_sysinfo[mfmnum][n][q];
                  updaterow[n]=1;
                  directrow[n]=1;

}

} /* end of directrow .ne. 1 */
```

APPENDIX B

```
    } /* end of loop for n */
  } /* end of if mfmnum does not represent a generator MFM */
    rem_update[mfmnum]=0;
  } /* end of if rem_update for when info from mfm # is true */
} /* end of mfmnum loop */
} /* end of if local mfm is not a generator mfm*/ return;
} /* end of sysinfo update using remote information */
```

APPENDIX C

```
/*                                                              APPENDIX C
; FILE:         mfm3dtmt.c
; DESCRIPTION:  Data Matching Algorithm
;
; Date: Sept 1999
; Rev G (previous rev f)
;
;   Naval Surface Warfare Center
;   Acoustic Trials Detachment
;   Attn: Tracy Hannon
;   740 Mullet Road
;   Cape Canaveral, FL 32940
;   (407-784-3645)
;
;
; ------------------------------------------------------------------
;        Data Matching Algorithm
;
;        This routine constructs the remote_mfm matrix which
;        stores information pertaining to adjacent mfm3's
;        fault counter, fault current direction and circuit
;        breaker status.  Sixteen samples of data are taken for the
;        remote buffer matrix and the remote buffer matrix
;        is constructed only during a fault event.
;
;        Calls to this routine should follow DATAUPDATE calls.
;
;
;        Once the remote buffer matrix is established,
;        a data matching routine tries to get matching sets
;        of fault event data.  Fault counters of the
;        remote data are compared to the fault counters of the
;        local data and shunt trip decisions are
;        made only when a full set of information is
;        found for a given fault counter.
;
;  Input Variables:
;
;  faultdetect, typemfm, faultreset,updaterow[]
;
;  remote_mfm[][][] : a 3x16x4 matrix filled with remote
;                     fault data, the first dimension represents
;                     the #1, 2 or 3 remote matrix information
;                     the second element represents 16 samples
;                     of data, the third element represents the
;                     storage of fault counter, fault direction,
;                     circuit breaker status, and low current flag,
;                     for each sample
;
;  rem_buf_cnt[] : counter for each of the three adjacent mfms,
;                  used to fill remote_mfm buffers
;
;  rem_ct1[]     : flag to update remote_mfm buffers with info
;                  from remote ct1 of appropriate adjacent mfm,
;                  preset to "0" for no update and "1" for update
;
;  rem_ct2[]     : flag to update remote_mfm buffers with info
```

APPENDIX C

```
;                       from remote ct2 of appropriate adjacent mfm,
;                       preset to "0" for no update and "1" for update
;
;   rem_row[]       : a pre-programmed matrix that contains
;                       the address number of adjacent mfms
;                       that the local mfm must compare data with.
;                       For example, for MFM#1, rem_row[0]=2,
;                       rem_row[1]=4, and rem_row[2]=0.
;
;   rem_fltcnt[]    : matrix used to store the last fault counter
;                       used for each of the three adjacent mfms
;                       used to match data
;
;
;   Local Variables:
;
;   buff_num        : used as array element in data matching update
;   local_bufn      : used as array element in remote buffer update
;   rem_mfm_n       : used as array element in remote buffer update
;   new_fltcnt[]    : matrix used to store flag for if new fault counter
;                       is present since last update of remote_mfm
;   datamatch[]     : matrix used to store flag to indicate that a
;                       data has been matched between local and remote
;                       mfms, used for cross tie matches and
;                       forward longitudinals
;   remote_row      : used as array element in remote buffer update
;   bufcnt          : used as array element in remote buffer update
;   bufnum          : used as array element in remote buffer update
;   renum           : used as array element in remote buffer update
;   max_count_2     : stores fault counter of remote mfm#2 for data
;                       matching with remote mfm#3
;   max_count_3     : stores fault counter of remote mfm#3 for data
;                       matching with remote mfm#2
;   match_fltcnt    : stores matching fault counter of mfm#2 and #3
;   match_flag      : flag to indicate if a matching fault counter
;                       among remote mfm #2 and #3 is found,
;                       "0" == no match, "1"== match
;   update          : flag to indicate if match_fltcnt is greater than
;                       last matching fault counter, old_fltcnt, and if
;                       match_flag == 1, "0"== no new update, "1" == update
;   rem_cb[]        : temporary storage of status of remote circuit
;                       breakers of mfm#1 or mfm#2 and #3, used to determine
;                       status of remotecb1 and remotecb2
;   rem_ct[]        : temporary storage of status of remote fault
;                       directions of mfm#1, mfm#2 and #3, used to determine
;                       status of remotect1 and remotect2
;   match[]         : used to flag appropriate assignment of values
;                       to remotect2
;
;
;   Output variables:
;
;       localct1  - fault current direction though ct#1
;                       of local mfm
;       localct2  - fault current direction though ct#2
;                       of local mfm
;       thirdct   - fault current direction through ct#3
```

APPENDIX C

```
;                    from adjacent mfm for inside corner mfm,
;                    needed for swbd fault determination
;       remotect1  - fault current direction though ct#1 of
;                    adjacent mfm #1
;       remotecb1  - status of ACB circuit breaker, cb#1,
;                    of adjacent mfm #1
;       remotect2  - fault current direction though ct#2
;                    of adjacent mfm #2
;       remotecb2  - status of ACB circuit breaker, cb#2,
;                    of adjacent mfm #2, may be combination
;                    of status of circuit breakers at mfm#2&3.
;       fullinfo1  - flag to indicate a full set of matching data
;                    between local mfm and adjacent mfm#1
;       fullinfo2  - flag to indicate a full set of matching data
;                    between local mfm and adjacent mfm#2
;       fullinfo3  - flag for full set of info between
;                    local mfm and adjacent mfm for swbd flt
;                    determination at inside corner mfm
;       old_fltcnt - stores last faultcounter used in
;                    data match between mfm#2 & mfm#3, used in
;                    successive data matching attempts
;
*/
include "ipcs.h"

/* moved to ipcsinit_rev_H 9/10/99 by TLH
int count_match1 = 0, count_match2 = 0;
*/ void DATAMATCH(void){ int i,j,k;
  int n,m;
  int max_count_2;
  int max_count_3;
  int match_fltcnt;
  int match_flag;
  int update;
  int rem_cb[3];
  int rem_ct[3];
  int rem_im[3];
  int match[3];

int buff_num;
  int local_bufn;
  int rem_mfm_n;

int new_fltcnt[3]={0,0,0};
  int datamatch[3]={0,0,0};

int remote_indx; /* 1/29/99 added TLH */
  int local_indx;  /* 1/29/99 added TLH */ fullinfo1=0;
fullinfo2=0;
fullinfo3=0;
```

APPENDIX C

```
if(sysinfo[localmfm-1][TYPECOL-1]!=GENERATOR){ if(sysinfo[localmfm-1][FLTRST-1]){
  rem_buf_cnt[0]=0;
  rem_buf_cnt[1]=0;
  rem_buf_cnt[2]=0;
  rem_fltcnt[0]=0;
  rem_fltcnt[1]=0;
  rem_fltcnt[2]=0;
  old_fltcnt=0;
  *out11=old_fltcnt;
  /*if(sysinfo[localmfm-1][FLTRST-1]){*/
    for(i=0;i<3;i++)
      {
      for(j=0;j<REM_BUF_SZ;j++)
        {
        for(k=0;k<4;k++)
          remote_mfm[i][j][k]=0;
        }
      }
  /* added 6/14/99 --TLH -- */
  countmatch[0]=0;
  countmatch[1]=0;
  countmatch[2]=0;
  count_match1=0;
  count_match2=0;
} if(faultdetect){
/* reinstalled by TLH 9/10/99 */
/* removed 9/10/99 ...else... by TLH */
/*
;This subroutine sets up (3) buffers w/16 samples of
;data for remote fault counters, ct and cb status.
;Buffers should be updated whenever new information
;has been received and that particular row in the system
;info matrix is updated.
;
;Each local mfm needs to be initialized with the row numbers
;necessary to for use in bus-tie fault determinations.
;Three remote rows of information are necessary since
;the 3s swbds need ct info from (2) remote mfms but
;cb from info (3) mfms.
*/ int remote_row;
        int bufcnt;
        int bufnum;

for (bufnum = 0;bufnum<3;bufnum++){ if(rem_row[bufnum]){ remote_row=rem_row[bufnum];

if(updaterow[remote_row-1]){
```

APPENDIX C

```
                if(rem_buf_cnt[bufnum]>(REM_BUF_SZ-1))
                        rem_buf_cnt[bufnum]=0;
                        bufcnt=rem_buf_cnt[bufnum];
                remote_mfm[bufnum][bufcnt][0]=sysinfo[remote_row-1][FLTCNT-1];

if(rem_ct1[bufnum]){
                  remote_mfm[bufnum][bufcnt][1]=sysinfo[remote_row-1][CT1COL-1];
                  remote_mfm[bufnum][bufcnt][3]=sysinfo[remote_row-1][LOW1ICOL-1];
                }
                        if(rem_ct2[bufnum]){
                  remote_mfm[bufnum][bufcnt][1]=sysinfo[remote_row-1][CT2COL-1];
                    remote_mfm[bufnum][bufcnt][3]=sysinfo[remote_row-1][LOW2ICOL-
1];
                        }
                  remote_mfm[bufnum][bufcnt][2]=sysinfo[remote_row-1][CBCOL-1];
                        rem_buf_cnt[bufnum]++;
                updaterow[remote_row-1]=0;

} /* end of if updaterow[] .eq. 1 */
          } /* end of if rem_row[] .ne. 0    */
        } /* end for bufnum                  */

/********** end of remote buffer algorithm *******************/

/*                                                                        */
/*  This routine searches for a match among the local fault counter       */
/*  and                                                                   */
/*  remote fault counters to use "synchronized" data in the bus-tie       */
/*  fault detection algorithm.                                            */
/*                                                                        */
/*  This routine need only be accessed if a local swbd fault is           */
/*  not detected but a fault is detected by the local mfm.                */

/* for (i=0;i<3;i++){
        datamatch[i]=0;
        new_fltcnt[i]=0;
  }
*/ for (rem_mfm_n=0;rem_mfm_n<3;rem_mfm_n++)
 { if((!rem_row[2])||
        (sysinfo[localmfm-1][TYPECOL-1]!=CORNER)||
        ((sysinfo[localmfm-1][TYPECOL-1]==CORNER)&&(!rem_mfm_n)))
    { buff_num=0;
          local_bufn = 0;
        new_fltcnt[rem_mfm_n]=0;

if((!rem_mfm_n)||(rem_mfm_n==1)||
            ((rem_mfm_n==2)&&(rem_row[2])))
            {
/*   only allow increment in remote buffer if last countmatch is
     the same as the rem_fltcnt used for last matching attempt in
```

APPENDIX C

```
     with local buffer information --- necessary for instances where
     local buffer information may be lagging received information from
     remote MFMs    9/10/99 --- TLH  */
           if(countmatch[rem_mfm_n]==rem_fltcnt[rem_mfm_n])
             {

1200:   buff_num++;

if(buff_num<=REM_BUF_SZ)
            {
            if(remote_index[rem_mfm_n]>(REM_BUF_SZ-1))
                   remote_index[rem_mfm_n]=0;
              remote_indx=remote_index[rem_mfm_n];
         if(remote_mfm[rem_mfm_n][remote_indx][0]>rem_fltcnt[rem_mfm_n])
              {
              rem_fltcnt[rem_mfm_n]=remote_mfm[rem_mfm_n][remote_indx][0];
              new_fltcnt[rem_mfm_n]=1;
                goto 1300;
             }
              else
                {
              remote_index[rem_mfm_n]++;
                goto 1200;
               }
          }/*end of if(buff_num<=REM_BUF_SZ)*/
            else
              new_fltcnt[rem_mfm_n]=0;
    /* added next 6 lines of code --- 9/10/99 --- TLH */
             }
           else
           {
                rem_fltcnt[rem_mfm_n]=remote_mfm[rem_mfm_n][remote_indx][0];
                new_fltcnt[rem_mfm_n]=1;
           }

1300:   if(new_fltcnt[rem_mfm_n]){

1400:       local_bufn++;

if(local_bufn<=LOC_BUF_SZ){
             if(local_index[rem_mfm_n]>(REM_BUF_SZ-1))
                local_index[rem_mfm_n]=0;
             local_indx=local_index[rem_mfm_n];
          if(local_mfm1[local_indx][0]==rem_fltcnt[rem_mfm_n]){
 /*       we have a match btw remote and local mfm counters   */
             datamatch[rem_mfm_n]=1;
                 countmatch[rem_mfm_n]=rem_fltcnt[rem_mfm_n]; /* added 9/10/99 */ switch(rem_mfm_n){
                 case 0:{
                    localct1 = local_mfm1[local_indx][1];
                         localimag1 = local_mfm2[local_indx][1];
                    remotect1 = remote_mfm[rem_mfm_n][remote_indx][1];
                    remotecb1 = remote_mfm[rem_mfm_n][remote_indx][2];
                    rmtimag1 = remote_mfm[rem_mfm_n][remote_indx][3];
```

APPENDIX C

```
                fullinfo1 = 1;
                        count_match1 = local_mfm1[local_indx][0];
                break;
                        } case 1:{
                localct2 = local_mfm1[local_indx][2];
                        localimag2 = local_mfm2[local_indx][2];
                remotect2 = remote_mfm[rem_mfm_n][remote_indx][1];
                remotecb2 = remote_mfm[rem_mfm_n][remote_indx][2];
                rmtimag2 = remote_mfm[rem_mfm_n][remote_indx][3];
                  fullinfo2 = 1;
                        count_match2 = local_mfm1[local_indx][0];
                        break;
                    } case 2:{
                thirdct = remote_mfm[rem_mfm_n][remote_indx][1];
                  fullinfo3 = 1;
                    }
                }

}
            else
                local_index[rem_mfm_n]++;
              goto 1400;

}
        else
            datamatch[rem_mfm_n]=0;

} /* end of if new_fltcnt[rem_mfm_n])                     */
    } /* end of if((rem_mfm_n==0)||(rem_mfm_n==1)||..... */
    } /* end of if((rem_row(2)==0)||        */

} /* end of for loop of rem_mfm_n */

/*    looking for a match among remote mfm counters for cb status   */ if((rem_row[2])&&(sysinfo[localmfm-1][TYPECOL-1]==CORNER)){
            if(count_match2==old_fltcnt){ /* added 9/10/99 -- TLH */
/*   find remote mfm with the lower maximum fault counter   */
            match_flag=0;
            update=0;
            match_fltcnt=0;
            max_count_2=0;
            max_count_3=0;

for (j=0;j<REM_BUF_SZ;j++){

/*    find maximum fault count in remote_mfm_2   */ if(remote_mfm[1][j][0]>max_count_2)
                max_count_2=remote_mfm[1][j][0];

/*    find maximum fault count in remote_mfm_3   */
```

APPENDIX C

```
            if(remote_mfm[2][j][0]>max_count_3)
               max_count_3=remote_mfm[2][j][0];

/*    if remote_mfm(3) has max fault count less than or     */
/*    equal to the max fault count of remote_mfm(3) use     */
/*    that fault counter to find data matches among remote  */
/*    and local buffers                                     */ if(max_count_3<=max_count_2)
                match_fltcnt=max_count_3;

/*    if remote_mfm(3) has max fault count less than        */
/*    the max fault count of remote_mfm(2) use              */
/*    that fault counter to find data matches among remote  */
/*    and local buffers                                     */ if(max_count_2<max_count_3)
                 match_fltcnt=max_count_2;

if(match_fltcnt==0)
               match_flag=0;
            else
               match_flag=1;

} /* end of for j */ if((match_fltcnt>old_fltcnt)&&match_flag){
            update=1;
            old_fltcnt=match_fltcnt;
         }
         else
            update=0;

if(update){ for (k=1;k<3;k++){
            for (n=0;n<REM_BUF_SZ;n++){
               if(remote_mfm[k][n][0]==match_fltcnt){
                  rem_cb[k]=remote_mfm[k][n][2];
                  rem_ct[k]=remote_mfm[k][n][1];
                  rem_im[k]=remote_mfm[k][n][3];
                  match[k]=1;
                  goto 1700;
               }
               else{
                         match[k]=0;
                         rem_cb[k]=99;
                         rem_ct[k]=9;
                         rem_im[k]=9;
                      }
            }
1700:;
            }
            if(match[1]){
               remotect2=rem_ct[1];
               rmtimag2=rem_im[1];
            }
```

APPENDIX C

```
    if((!match[1])&&(match[2])){
      remotect2=rem_ct[2];
      rmtimag2=rem_im[2];
    } if((!rem_cb[1])&&(!rem_cb[2]))
          remotecb2=0;

else if((rem_cb[1]==1)||(rem_cb[2]==1))
      remotecb2=1;

else
      remotecb2=99;

} /* end of if update is true */
    /* start of new code 9/10/99 --- TLH */
    } /* end of if countmatch[1]=old_fltcnt */
    else
    {
        match_fltcnt=old_fltcnt;
    }
  if(count_match2!=match_fltcnt)
      {
      /* end of new code 9/10/99 --- TLH */
        for (m=0;m<LOC_BUF_SZ;m++){
          if(local_mfm1[m][0]==match_fltcnt){
            localct2=local_mfm1[m][2];
                    localimag2=local_mfm2[m][2];
              fullinfo2=1;
                    count_match2=match_fltcnt;
                    goto 1800;
          }
                else{
                    localct2=9;
                    fullinfo2=0;
                }
          }
      }/* added 9/10/99 TLH */1800:;

} /* end of if((rem_row[2]!=0)&&(sysinfo[localmfm-1][TYPECOL-1]==CORNER)   */
} /* end of if flt condition exists*/
} /* end of if mfm3type .ne. generator */
return;
}
/*                                                              */
/********** end of data matching detection algorithm**************/
```

APPENDIX D

```
/*                                                                    APPENDIX D
; THIS FILE SHOULD BE USED IF RUNNING MFM3IPCS_Rev_F.C EVERY 1.0ms
;
; FILE:         ipcs.h
; DESCRIPTION:  defining constants used in IPCS code
;
; Date: Sept 1999
; Rev J
;
;    Naval Surface Warfare Center
;    Acoustic Trials Detachment
;    Attn: Tracy Hannon
;    740 Mullet Road
;    Cape Canaveral, FL 32940
;    (407-784-3645)
;
*/ define MFM3NUM 1  /* number assigned to MFM3 */
        #define MFM3LOC 1  /* location assigned to MFM3
                              corresponds to swdb number */
        #define MFM3TYPE 1 /* number assigned to type of
                              MFM3, 1 == corner, 2 ==straight
                              3 == inside corner, 4 == generator */ define DISTRMFM  11 /* the # of rows = # mfm3s */
        #define CLMNINFO  15 /* the number of columns */ define REM_BUF_SZ 16 /* # of rows in remote buffers */
        #define LOC_BUF_SZ 16 /* # of rows in local buffer */

/*      Column labels for system information matrix    */ define NUMGENSET  3 /* number og generator sets */
        #define ACTIVEMFM3 11 /* number of distribution MFM3s
                                 in electrical system */ define NUMCOL    1   /* column for mfm3num info*/
        #define LOCCOL    2   /* column for mfm3loc info*/
        #define TYPECOL   3   /* column for mfm3type info*/
        #define CT1COL    4   /* column for direction in ct1*/
        #define CT2COL    5   /* column for direction in ct2*/
        #define CBCOL     6   /* column for local cb status*/
        #define FLTCOL    7   /* column for flt status*/
        #define SWBDCOL   8   /* column for swbd flt status*/
        #define MFM1COL   9   /* column for MFM1 action*/
        #define FLTCNT   10   /* column for fault counter*/
        #define FLTRST   11   /* column for fault reset */
        #define CBSTCOL  12   /* column for cb shunt trip status*/
        #define STATCOL  13   /* column for okay status*/
        #define LOW1ICOL 14   /* column for low current in ct1*/
        #define LOW2ICOL 15   /* column for low current in ct2*/

/*      Type of MFM3   */
```

APPENDIX D

```
#define CORNER       1      /* aft or forward corner */
#define STRAIGHT     2      /* straight */
#define INSIDECORNER 3      /* inside corner */
#define GENERATOR    4      /* generator */

/* Constants used in mfm3_ipcs.c code for access every 1.0ms*/ define NSTART_MFM3 16 /* # samples for startup */
define NSAMPLE 2    /* # faultcounts to pass before direction set */
#define NBTSAMPLE  2 /* #samples for bus flt based on remote ct */
#define NCBSAMPLE  4 /* #samples for bus flt based on remote cb */
#define NSWBDSAMPLE  2 /* #samples required for local swbd flt */
#define NCOMMSAMPLE  5 /* #samples before action on local swbd flt
                          tcomm*(5 pt-to-pt)/0.5sec */ define MAX_FLTCNT  511 define MAX_FLTRST  5 /* added 9/10/99 by TLH for rev J mfm3ipcs*/

/* counters used for the suppression of avepow calculations
   following the open of ACB circuit breakers */ define LOWSUPPRESS  20 /* # of samples for beginning
                           suppression of avepow */
#define HISUPPRESS   86 /*# of samples for ending
                           suppression of avepow */

/* parameters used to set direction of fault current:
;
; direction is only established if the absolute
; value of the calculated average power is greater than
; the average power thresholds below */ define LOWNEGPOW  -0.025
define LOWPOSPOW   0.025

/* direction is only established if the
; absolute value of the change in
; fault power to steady state power levels
; exceeds the threshold determined by
; POWMAG*(steady state power)*/ define POWMAG    1.0

/* direction is only established if the
; system voltage magnitude is greater
; than 0.5Vrms or the equivalent of
; 0.00111 per unit, magnitudes less than
; threshold are considered not to be
; reliable */ define LOWVOLT 0.00111 /* 0.00111 Change 5/27/98 - to help rid us of spurious
fault detects */
#define LOWCURRENT 0.021
#define LOWIPU 0.125
```

APPENDIX D

```c
define HIGHIPU 1.25 extern int sysinfo[DISTRMFM][CLMNINFO];
extern int localmfm;
extern int location;
extern int typemfm;

extern float Volts1[2];
extern float Volts2[2];
extern float Amps1[3];
extern float Amps2[3];
extern int cbstat;

extern int ct1;
extern int ct2;
extern float magn1;
extern float magn2;
extern float imag1;
extern float imag2;
extern float power1;
extern float power2;
extern float sum_pow1;
extern float sum_pow2;
extern int ig1;
extern int close_acb;
extern int new_cbstat;
extern int fltdetect1;
extern int fltdetect2;
extern int faultdetect;
extern int faultcount;
extern int faultreset;
extern int fltrst_cnt;  /* added 9/10/99 for rev J mfm3ipcs changes */
extern int ctdir1;
extern int ctdir2;

extern int loc_buf_cnt;

extern int local_mfm1[LOC_BUF_SZ][3];
extern int local_mfm2[LOC_BUF_SZ][3];
extern int local_index[3];              /* added for rev f data match*/
extern int remote_index[3];         /* added for rev f data match*/
extern int remote_mfm[3][REM_BUF_SZ][4];
extern int rem_buf_cnt[3];
extern int updaterow[DISTRMFM];
extern int rem_update[DISTRMFM];
extern int rem_sysinfo[DISTRMFM][DISTRMFM][CLMNINFO];

/* added 9/10/99 by TLH for rev g datamatch changes*/
extern int count_match1;
extern int count_match2;
extern int countmatch[3];

extern int tglineup;
extern int stdconfig;
```

APPENDIX D

```
extern int localct1;
extern int localct2;
extern int thirdct;
extern int fullinfo3;
extern int stswbd;
extern int swbdflt;

extern int remotecb1;
extern int remotect1;
extern int remotecb2;
extern int remotect2;
extern int dirct1;
extern int dirct2;

extern int fullinfo1;
extern int fullinfo2;
extern int rmtimag1;
extern int rmtimag2;
extern int localimag1;
extern int localimag2;

extern int stct1_dir;
extern int stct2_dir;
extern int stct1_mag;
extern int stct2_mag;

extern int rem_fltcnt[3];
extern int match_fltcnt;
extern int stacb;

extern int stct1count;
extern int stct2count;
extern int nct1_ct;
extern int nct2_ct;
extern int nct1_cb;
extern int nct2_cb;
extern int nct1_im;
extern int nct2_im;

extern int swbdflag;
extern int Nswbd;
extern int swbdcount;
extern int Nswbdmax;

extern int Nswbdcomm;
extern int Ncommdelay;
extern int nstswbdflag;
extern int nstswbdmax;

extern int Nstartup;

extern int set_stinit;
extern int btfltct1;
extern int btfltct2;
extern int stct1;
extern int stct2;
```

APPENDIX D

```
extern int old_fltcnt;
extern int rem_row[3];
extern int rem_ct1[3];
extern int rem_ct2[3];

extern int max_count_2;
extern int max_count_3;
extern int match_flag;
extern int update_match;
```

APPENDIX E

```
/*                                                                  APPENDIX E
; FILE:         info_in.c
; DESCRIPTION:  Remote system information updating routine
;
; Date: Dec 1998
; Rev E
;
;    Naval Surface Warfare Center
;    Acoustic Trials Detachment
;    Attn: Tracy Hannon
;    740 Mullet Road
;    Cape Canaveral, FL 32940
;    (407-784-3645)
;
; ---------------------------------------------------------------------
;    As information is received over the (3) ethernet ports, the
;    incoming matrices are stored in one of three 11 x 12 matrices
;    called new_info_1, new_info_2, and new_info_3,
;    and the mfm# from which it was sent is stored in remotemfm_1,
;    remotemfm_2, and remotemfm_3, respectively
;
;    In this routine:
;
;    Matrix 'new_info' is used to modify an 11 x 11 x 12
;    matrix called rem_sysinfo.  The first dimension of this
;    matrix represents the number of the remote mfm that the
;    information was sent from, i.e., if mfm #8 info reaches mfm3 #2,
;    the matrix from mfm #8 is stored in mfm #2's
;    rem_sysinfo[7][][].  The first array element is always one less than
;    the mfm # from which the info arrived because the
;    c-language element numbers begin at 0 instead of 1.
;
;
;    WARNING:  Do not allow new_info[][] or remotemfm to be modified
;    with newly arrived remote information
;    during execution of this routine.  All other MFM3 routines can
;    be interrupted as new_info[][] and remotemfm_# are updated.
; ---------------------------------------------------------------------
;
;    Possible calls to this routine may look like:
;
;    For information over ethernet port #1:
;    new_info_flag[0]=info_in(mfmnum_1,new_info_1)
;    For information over ethernet port #2:
;    new_info_flag[1]=info_in(mfmnum_2,new_info_2)
;    For information over ethernet port #3:
;    new_info_flag[2]=info_in(mfmnum_3,new_info_3)
;
; ---------------------------------------------------------------------
;          Input Variables:
;
;          new_info[][][]: an 11x12 matrix that stores information
;                          received over any of the three ethernet
;                          ports.
;
;          remotemfm     : the number assigned to the mfm which sent
```

NONPROVISIONAL PATENT APPLICATION     NAVY CASE NO. 82,673

APPENDIX E

```
;                       the system information stored in
;                       new_info[][]
;
;
;   ------------------------------------------------------------
;       Output Variables:
;
;   rem_sysinfo[][][]   : an 11x11x12 remote system information matrix
;                         that contains matrices from all remote
;                         mfms using information obtained
;                         over the (3) ethernet ports
;
;         remupdate[]   : a vector used to flag where data has been
;                         received from, i.e. if remupdate[4]=1 that
;                         means that a remote system information matrix
;                         from mfm #5 was received and used to
;                         update the rem_sysinfo matrix,
;                         "0" for no updates, "1" for update
;
;     new_infoflag      : a flag to show that the information contained
;                         in new_info has been used to update
;                         rem_sysinfo, can possibly be used to allow
;                         update new_info matrix with the next incoming
;                         set of remote information
;
;   rem_sysinfo[][][] and remupdate[] are later used to update
;   the local system information matrix, sysinfo[][].
;
;   ------------------------------------------------------------
*/
include "ipcs.h"

int info_in(int *input1,int new_info[DISTRMFM][CLMNINFO]){ int new_infoflag;
   int mfmnum,remotemfm;
   int j;
   int k;
   remotemfm=*input1;
   mfmnum=remotemfm-1;

for (j=0;j<DISTRMFM;j++){
              for (k=0;k<CLMNINFO;k++)
                 rem_sysinfo[mfmnum][j][k]=new_info[j][k];
           }
             rem_update[mfmnum]=1;
                 new_infoflag=0;

return(new_infoflag);
}
/*                                                                   */
/******************* end of info_in algorithm *********************/
```

APPENDIX F

```
/*                                                              APPENDIX F
; FILE:        ipcsinit.c
; DESCRIPTION: Initializing global variables needed for IPCS code
;
; Date: Sept 1999
; Rev H (previous Rev G)
;
;   Naval Surface Warfare Center
;   Acoustic Trials Detachment
;   Attn: Tracy Hannon
;   740 Mullet Road
;   Cape Canaveral, FL 32940
;   (407-784-3645)
;
*/ include "ipcs.h"

int sysinfo[DISTRMFM][CLMNINFO];
int localmfm;
int location;
int typemfm;

float Volts1[2];
float Volts2[2];
float Amps1[3];
float Amps2[3];
int cbstat=99;

int ct1=99;
int ct2=99;
float magn1=0;
float magn2=0;
float imag1=0;
float imag2=0;
float power1=0;
float power2=0;
float sum_pow1=0;
float sum_pow2=0;
int ig1=99;
int close_acb=0;
int new_cbstat=0;
int fltdetect1=0;
int fltdetect2=0;
int faultdetect=0;
int faultcount=0;
int faultreset=0;
int fltrst_cnt=0; /* added 9/10/99 for rev J mfm3ipcs changes */
int ctdir1=9;
int ctdir2=9;

int loc_buf_cnt=0;

int local_mfm1[LOC_BUF_SZ][3];
int local_mfm2[LOC_BUF_SZ][3];
int local_index[3]={0,0,0}; /* 1/29/99 TLH */
```

APPENDIX F

```
int remote_index[3]={0,0,0};  /* added for rev f datamatch changes*/ int remote_mfm[3][REM_BUF_SZ][4];
int rem_buf_cnt[3];
int updaterow[DISTRMFM];
int rem_update[DISTRMFM];
int rem_sysinfo[DISTRMFM][DISTRMFM][CLMNINFO];

/* added 9/10/99 by TLH  for mods to rev g datamatch changes*/
int count_match1 = 0, count_match2 = 0;
int countmatch[3]={0,0,0};

int tglineup=0;
int stdconfig=0;

int localct1=9;
int localct2=9;
int thirdct=9;
int fullinfo3=0;
int stswbd=0;
int swbdflt=0;

int remotecb1=99;
int remotect1=9;
int remotecb2=99;
int remotect2=9;
int dirct1;
int dirct2=1;

int fullinfo1=0;
int fullinfo2=0;
int rmtimag1=0;
int rmtimag2=0;
int localimag1=0;
int localimag2=0;

int stct1_dir=0;
int stct2_dir=0;
int stct1_mag=0;
int stct2_mag=0;

int rem_fltcnt[3];
int match_fltcnt=0;
int stacb=0;

int stct1count=0;
int stct2count=0;
int nct1_ct=0;
int nct2_ct=0;
int nct1_cb=0;
int nct2_cb=0;
int nct1_im=0;
int nct2_im=0;

int swbdflag=0;
```

APPENDIX F

```
int Nswbd=0;
int swbdcount=0;
int Nswbdmax=0;

int Nswbdcomm=0;
int Ncommdelay=0;
int nstswbdflag=0;
int nstswbdmax=0;

int Nstartup=0;

int set_stinit=0;
int btfltct1=0;
int btfltct2=0;
int stct1=0;
int stct2=0;

int old_fltcnt=0;
int rem_row[3];
int rem_ct1[3];
int rem_ct2[3];

int max_count_2=0;
int max_count_3=0;
int match_flag=0;
int update_match=0;

void INITIPCS(void)
{
        int i,j,k,q,p,m,n;

rem_fltcnt[0]=0;
        rem_fltcnt[1]=0;
        rem_fltcnt[2]=0;

for (i=0;i<DISTRMFM;i++)
        {
                for(j=0;j<CLMNINFO;j++)
        sysinfo[i][j]=0;
        } sysinfo[localmfm-1][NUMCOL-1]=localmfm;
        sysinfo[localmfm-1][LOCCOL-1]=location;
        sysinfo[localmfm-1][TYPECOL-1]=typemfm;

for(i=0;i<LOC_BUF_SZ;i++)
        {
                for(j=0;j<3;j++)
                {
        local_mfm1[i][j]=0;
        local_mfm2[i][j]=0;
                }
        } if(typemfm == STRAIGHT)
        dirctl = 1;
```

APPENDIX F

```
else
dirct1 = -1;

for(m=0;m<3;m++)
{
        for(n=0;n<REM_BUF_SZ;n++)
        {
                for(p=0;p<4;p++)
                        remote_mfm[m][n][p]=0;
        }
} rem_buf_cnt[0]=0;
rem_buf_cnt[1]=0;
rem_buf_cnt[2]=0;

for(q=0;q<DISTRMFM;q++)
        updaterow[q]=99;

for(i=0;i<DISTRMFM;i++)
{
        rem_update[i]=0;
        for(j=0;j<DISTRMFM;j++)
        {
                for(k=0;k<CLMNINFO;k++)
                        rem_sysinfo[i][j][k]=0;
        }
} if(localmfm == 1)
{
        rem_row[0]=2;
        rem_row[1]=3;
        rem_row[2]=0;
        rem_ct1[0]=1;
        rem_ct2[0]=0;
        rem_ct1[1]=1;
        rem_ct2[1]=0;
        rem_ct1[2]=0;
        rem_ct2[2]=0;
}
if(localmfm == 2)
{
        rem_row[0]=1;
        rem_row[1]=4;
        rem_row[2]=0;
        rem_ct1[0]=1;
        rem_ct2[0]=0;
        rem_ct1[1]=1;
        rem_ct2[1]=0;
        rem_ct1[2]=0;
        rem_ct2[2]=0;
}
if(localmfm == 3)
{
        rem_row[0]=1;
```

APPENDIX F

```
        rem_row[1]=7;
        rem_row[2]=0;
        rem_ct1[0]=0;
        rem_ct2[0]=1;
        rem_ct1[1]=0;
        rem_ct2[1]=1;
        rem_ct1[2]=0;
        rem_ct2[2]=0;
}
if(localmfm == 4)
{
        rem_row[0]=2;
        rem_row[1]=8;
        rem_row[2]=0;
        rem_ct1[0]=0;
        rem_ct2[0]=1;
        rem_ct1[1]=0;
        rem_ct2[1]=1;
        rem_ct1[2]=0;
        rem_ct2[2]=0;
}
if(localmfm == 5)
{
        rem_row[0]=6;
        rem_row[1]=7;
        rem_row[2]=3;
        rem_ct1[0]=1;
        rem_ct2[0]=0;
        rem_ct1[1]=0;
        rem_ct2[1]=1;
        rem_ct1[2]=1;
        rem_ct2[2]=0;
}
if(localmfm == 6)
{
        rem_row[0]=5;
        rem_row[1]=8;
        rem_row[2]=4;
        rem_ct1[0]=1;
        rem_ct2[0]=0;
        rem_ct1[1]=0;
        rem_ct2[1]=1;
        rem_ct1[2]=1;
        rem_ct2[2]=0;
}
if(localmfm == 7)
{
        rem_row[0]=8;
        rem_row[1]=5;
        rem_row[2]=3;
        rem_ct1[0]=1;
        rem_ct2[0]=0;
        rem_ct1[1]=0;
        rem_ct2[1]=1;
        rem_ct1[2]=0;
        rem_ct2[2]=0;
}
```

APPENDIX F

```
if(localmfm == 8)
{
        rem_row[0]=7;
        rem_row[1]=6;
        rem_row[2]=4;
        rem_ct1[0]=1;
        rem_ct2[0]=0;
        rem_ct1[1]=0;
        rem_ct2[1]=1;
        rem_ct1[2]=0;
        rem_ct2[2]=0;
}

Volts1[0]=0;
Volts1[1]=0;
Volts2[0]=0;
Volts2[1]=0;
Amps1[0]=0;
Amps1[1]=0;
Amps1[2]=0;
Amps2[0]=0;
Amps2[1]=0;
Amps2[2]=0;

return;
}
```

What is claimed is:

1. For use in association with an electrical distribution system having a plurality of circuit breakers, apparatus comprising a plurality of devices and networking means for said devices, each said device including an electrical sensor and a computer, whereby each said device is paired with a corresponding said circuit breaker, and wherein each said computer is capable of;

receiving sensory information form the corresponding said electrical sensor, said sensory information pertaining to at least one location proximate the corresponding said circuit breaker;

processing the corresponding said sensory information into processed electrical current direction information; and receiving the corresponding said processed current direction information generated by the remaining said devices;

wherein said sensory information received from the corresponding said electrical sensor pertains to at least two said locations proximate the corresponding said circuit breaker, and wherein at least two said locations are at opposite sides of corresponding said circuit breaker.

2. Apparatus as defined in claim 1, wherein each said device is capable of processing the cumulative said processed electrical current direction information into processed fault identification information.

3. Apparatus as defined in claim 2, wherein each said device is capable of regulating the corresponding said circuit breaker based on said fault identification information.

4. Apparatus as defined in claim 1, wherein:

said networking means includes a plurality of network links;

each said network link connects two said devices;

upon failure of any said network link, each said computer is capable of circumventing said failure so as to effectuate said receiving of the corresponding said processed current direction information generated by the remaining said devices.

5. A computer program product comprising a computer useable medium having computer program logic recorded thereon for enabling a plurality of computer means to identify and to choose to isolate a state of defectiveness in an electro-mechanical system for transmitting a transmissible medium, said electro-mechanical system having a plurality of transmission cessation means, wherein each said computer means has a said transmission cessation means associated therewith, and wherein said computer program logic comprises:

means for enabling each said computer means to process, into local defectiveness information, data relating to said associated transmission cessation means;

means for enabling each said computer means to ascertain said state of defectiveness, based on said local defectiveness information;

means for enabling each said computer means to process, into local transmission direction information, data relating to said associated transmission cessation means;

means for enabling each said computer means to receive remote transmission direction information, wherein said remote transmission direction information includes an aggregation of the associated said local transmission direction information respectively processed by every other said computer means, and wherein every other said computer means processes, into the associated said local transmission direction information, data relating to said associated transmission cessation means;

means for enabling each said computer means to ascertain the location of said state of defectiveness, based at least on the combination of said local transmission direction information and said remote transmission direction information; and means for enabling each said computer means to determine whether said associated transmission cessation means should be activated.

6. A computer program product as recited in claim 5, wherein said computer program logic comprises means for enabling each said computer means to activate said associated transmission cessation means.

7. A computer program product as recited in claim 5, wherein said transmissible medium is selected from the group consisting of electricity and fluid, and wherein said fluid is selected from the group consisting of liquid and gas.

8. A computer program product as recited in claim 5, wherein said transmissible medium is electricity, and wherein said transmission cessation means includes circuit breaking means.

9. A computer program product as recited in claim 5, wherein said transmissible medium is fluid, and wherein said transmission cessation means includes valvular means.

10. A computer program product as recited in claim 9, wherein said fluid is one of liquid fluid and gaseous fluid.

11. A method for identifying and deciding whether to isolate a state of defectiveness in an electro-mechanical system for transmitting a transmissible medium, said electro-mechanical system having a plurality of transmission cessation means, and wherein said method comprises:

associating a computer means with each said transmission cessation means;

using each said computer means to process, into local defectiveness information, data relating to the transmission cessation means associated therewith;

using each said computer means to ascertain said state of defectiveness, based on said local defectiveness information;

using each said computer means to process, into local transmission direction information, data relating to said transmission cessation means associated therewith;

using each said computer means to receive remote transmission direction information, wherein said remote transmission direction information includes all of said local transmission direction information respectively processed by every other said computer means of data relating to said transmission cessation means associated therewith;

using each said computer means to ascertain the location of said state of defectiveness, based at least on the combination of said local transmission direction information and said remote transmission direction information; and using each said computer means to determine whether the transmission cessation means associated therewith should be activated.

12. The method as defined in claim 11, wherein said method comprises using each said computer means to activate the transmission cessation means associated therewith.

13. The method as defined in claim 11, wherein said transmissible medium is selected from the group consisting of electricity and fluid, and wherein said fluid is selected from the group consisting of liquid and gas.

14. The method as defined in claim 11, wherein said transmissible medium is electricity, and wherein said transmission cessation means includes circuit breaking means.

15. The method as defined in claim 11, wherein said transmissible medium is fluid, and wherein said transmission cessation means includes valvular means.

16. The method as defined in claim 11, wherein said fluid is one of liquid fluid and gaseous fluid.

* * * * *